(12) United States Patent
Richardson et al.

(10) Patent No.: US 12,372,713 B1
(45) Date of Patent: Jul. 29, 2025

(54) HIGH POWER IN-BAND PUMPED, TRIPLE CLAD THULIUM FIBER

(71) Applicant: University of Central Florida Research Foundation, Inc., Orlando, FL (US)

(72) Inventors: Martin Richardson, Orlando, FL (US); Justin Cook, Orlando, FL (US); Nathan Bodnar, Orlando, FL (US); Nicholas Vail, Orlando, FL (US); Alex Sincore, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 82 days.

(21) Appl. No.: 17/882,272

(22) Filed: Aug. 5, 2022

Related U.S. Application Data

(60) Provisional application No. 63/229,832, filed on Aug. 5, 2021.

(51) Int. Cl.
*G02B 6/02* (2006.01)
*G02B 6/036* (2006.01)

(52) U.S. Cl.
CPC ..... *G02B 6/02395* (2013.01); *G02B 6/02033* (2013.01); *G02B 6/02371* (2013.01); *G02B 6/036* (2013.01)

(58) Field of Classification Search
CPC ............ G02B 6/02033; G02B 6/02371; G02B 6/02395; G02B 6/036
See application file for complete search history.

(56) References Cited

U.S. PATENT DOCUMENTS

| 7,050,686 | B2 * | 5/2006 | Farroni ................. | G02B 6/024 |
| | | | | 65/385 |
| 9,627,838 | B2 * | 4/2017 | Creeden ............... | H01S 3/1616 |
| 9,837,783 | B2 * | 12/2017 | Kliner .................. | H01S 3/0675 |

OTHER PUBLICATIONS

Creeden, et al., "High power resonant pumping of Tm-doped fiber amplifiers in core- and cladding-pumped configurations", Optics Express, vol. 22, No. 23, p. 29067, 2014. doi: 10.1364/OE.22.029067.

Delevaque, et al., "Modeling of pair-induced quenching in erbium-doped silicate fibers," in IEEE Photonics Technology Letters, vol. 5, No. 1, pp. 73-75, Jan. 1993, doi: 10.1109/68.185065.

Hansryd, et al., "Fiber-based optical parametric amplifiers and their applications," in IEEE Journal of Selected Topics in Quantum Electronics, vol. 8, No. 3, pp. 506-520, May-Jun. 2002, doi: 10.1109/JSTQE.2002.1016354.

Hemming et al., High power operation of cladding pumped holmium-doped silica fibre lasers. Opt Express. Feb. 25, 2013;21(4):4560-6. doi: 10.1364/OE.21.004560. PMID: 23481989.

(Continued)

*Primary Examiner* — Ryan A Lepisto
(74) *Attorney, Agent, or Firm* — Suiter Swantz IP

(57) ABSTRACT

A thulium fiber is described. The thulium fiber is designed for in-band pumping. The thulium fiber may take advantage of higher efficiencies and lower thermal load associated with in-band pumping. The thulium fiber may include a triple clad design. The triple clad design may offer a balance between thermal effects, modulation instability thresholds, and pump absorption. The thulium fiber may provide greater than 5 kilowatts of continuous wave (CW) output power across the 1950-2100 nanometer region.

24 Claims, 18 Drawing Sheets

(56) References Cited

OTHER PUBLICATIONS

Jackson et al., "Theoretical modeling of Tm-doped silica fiber lasers," in Journal of Lightwave Technology, vol. 17, No. 5, pp. 948-956, May 1999, doi: 10.1109/50.762916.
Jackson, et al., "Dynamics of the output of heavily Tm-doped double-clad silica fiber lasers", Journal of the Optical Society of America B Optical Physics, vol. 16, No. 12, pp. 2178-2188, 1999. doi:10.1364/JOSAB.16.002178.
Jackson, Stuart et al., (2003). Efficiency Dependence on the Tm3+ and Al3+ Concentrations for Tm3+-Doped Silica Double-Clad Fiber Lasers. Applied optics. 42. 2702-7. 10.1364/AO.42.002702.
Jackson, Stuart. (2004). Cross relaxation and energy transfer upconversion processes relevant to the functioning of 2 μm Tm3+-doped silica fibre lasers. Optics Communications. 230. 197-203. 10.1016/j.optcom.2003.11.045.
Jin et al., High-efficiency ultrafast Tm-doped fiber amplifier based on resonant pumping. Opt Lett. Apr. 1, 2018;43 (7):1431-1434. doi: 10.1364/OL.43.001431. PMID: 29600997.
Kelleher, et al., (2012). Role of pump coherence in the evolution of continuous-wave supercontinuum generation initiated by modulation instability. JOSA B. 29. 502-512. 10.1364/JOSAB.29.000502.
Lin, et al., (2018). 656 W Er-doped, Yb-free large-core fiber laser. Optics letters, 43 13, 3080-3083.
Liu et al., Tandem-pumped, tunable thulium-doped fiber laser in 2.1 μm wavelength region. Opt Express. Mar. 18, 2019;27(6):8283-8290. doi: 10.1364/OE.27.008283. PMID: 31052649.
Maurice et al., Clustering-induced nonsaturable absorption phenomenon in heavily erbium-doped silica fibers. Opt Lett. Dec. 15, 1995;20(24):2487. doi: 10.1364/ol.20.002487. PMID: 19865261.
Miniscalco, William. (1991). Erbium-doped glasses for fiber amplifiers at 1500 nm. Lightwave Technology, Journal of. 9. 234-250. 10.1109/50.65882.
Moulton et al., "Tm-Doped Fiber Lasers: Fundamentals and Power Scaling," in IEEE Journal of Selected Topics in Quantum Electronics, vol. 15, No. 1, pp. 85-92, Jan. 2009, doi: 10.1109/JSTQE.2008.2010719.

Myslinski, et al., "Effects of concentration on the performance of erbium-doped fiber amplifiers," in Journal of Lightwave Technology, vol. 15, No. 1, pp. 112-120, Jan. 1997, doi: 10.1109/50.552118.
Peng, et al., (1995). Optical properties, fluorescence mechanisms and energy transfer in Tm3+, Ho3+ and Tm3+-Ho3 + doped near-infrared laser glasses, sensitized by Yb3+. Optical Materials, 4, 797-810.
Santran, et al., (2004). Precise and absolute measurements of the complex third-order optical susceptibility. JOSA B. 21. 2180-2190. 10.1364/JOSAB.21.002180.
Simpson, et al., (2006). Energy transfer up-conversion in Tm3+-doped silica fiber. Journal of Non-Crystalline Solids. 352. 10.1016/j.jnoncrysol.2005.11.019.
Sincore, et al., (2017). High Average Power Thulium-Doped Silica Fiber Lasers: Review of Systems and Concepts. IEEE Journal of Selected Topics in Quantum Electronics. pp. 1-1. 10.1109/JSTQE.2017.2775964.
Sincore, et al., (2017). SBS Threshold Dependence on Pulse Duration in a 2053 nm Single-Mode Fiber Amplifier. Journal of Lightwave Technology. pp. 1-1. 10.1109/JLT.2017.2729508.
Vatarescu, Andre. (1988). Light Conversion in Nonlinear Monomode Optical Fibers. Lightwave Technology, Journal of. 5. 1652-1659. 10.1109/JLT.1987.1075483.
Wang, et al., (2015). High power tandem-pumped thulium-doped fiber laser. Optics Express. 23. 2991. 10.1364/OE.23.002991.
Xiao, et al., (2015). High-power 1018 nm ytterbium-doped fiber laser and its application in tandem pump. Applied Optics. 54. 8166. 10.1364/AO.54.008166.
Yao, et al., (2018). 790 W incoherent beam combination of a Tm-doped fiber laser at 1941 nm using a 3×1 signal combiner. Applied Optics. 57. 10.1364/AO.57.005574.
Zou, et al., "Spectroscopic properties and energy transfers in Tm3+ singly- and Tm 3+/ Ho3+ doubly-doped glasses", Journal of Non Crystalline Solids, vol. 195, No. 1, pp. 113-124, 996. doi:10.1016/0022-3093(95)00522-6.

* cited by examiner

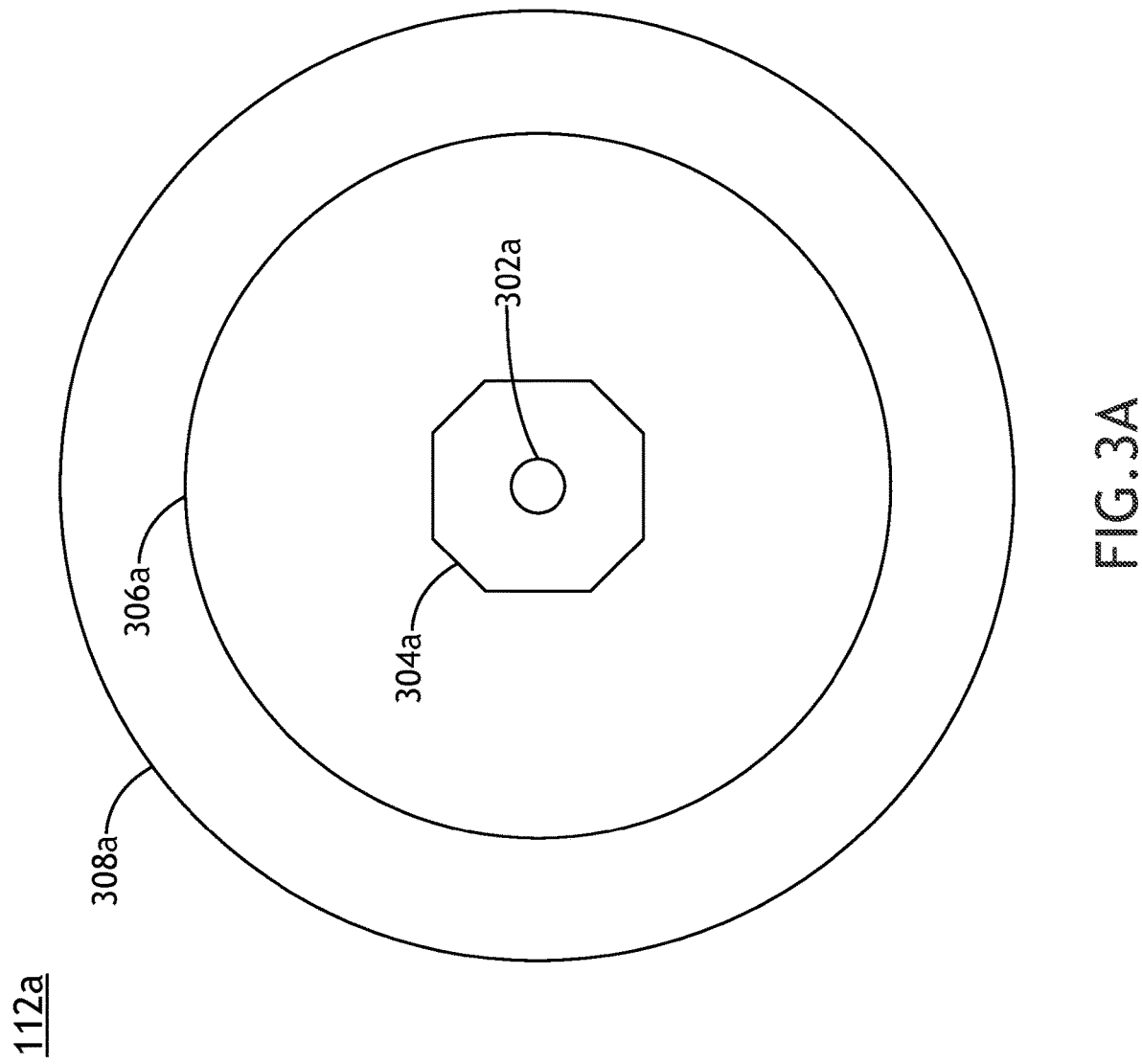

HIGH POWER IN-BAND PUMPED, TRIPLE CLAD THULIUM FIBER

CROSS-REFERENCE TO RELATED APPLICATIONS

The present application claims the benefit under 35 U.S.C. Section 119(e) of U.S. Provisional Application No. 63/229,832, filed Aug. 5, 2021, titled HIGH POWER IN-BAND PUMPED, TRIPLE CLAD THULIUM FIBER, naming Martin Richardson, Justin Cook, Nathan Bodnar, Nicholas Vail, and Alex Sincore as inventors, which is incorporated herein by reference in the entirety.

GOVERNMENT LICENSE RIGHTS

This invention was made with Government support under grant number FA9550-15-1-0041 awarded by the Air Force Office of Scientific Research (AFOSR). The Government has certain rights in this invention.

TECHNICAL FIELD

The present disclosure relates generally to optical fibers for laser systems, and more particularly to systems and methods for thulium-doped fiber lasers.

BACKGROUND

Thulium-doped fiber lasers (TDFL) have experienced the second highest output power growth next to ytterbium-doped fiber lasers (YDFL). The output power growth for the TDFL has been facilitated by the development and use of high power/brightness 793 nanometer diodes. The cross-relaxation (CR) process, whereby two signal photons are generated for each absorbed pump photon, can theoretically provide up to 80% optical-to-optical conversion efficiencies in TDFLs when pumped at 793 nanometers. However, typical efficiencies are in the regime of 50 to 65%, which may still be relatively low. While the CR process is a remarkable improvement over the less than 40% efficiencies achieved without CR, the conversion efficiencies unfortunately induce very high thermal loads in the active fiber. Currently, using the 793-nanometer pumping architecture, thermal failure of the polymer jacketing is the main limitation towards further power scaling of high power TDFLs. It is therefore desirable to provide systems and methods for improving the efficiency and/or power of thulium-doped fibers lasers.

SUMMARY

An optical fiber is described, in accordance with one or more embodiments of the present disclosure. In some embodiments, the optical fiber includes a core with a circular cross-section. In some embodiments, the core has a core diameter, a core numerical aperture, and a V-number. In some embodiments, the core diameter is greater than or equal to 20 micrometers. In some embodiments, the core is configured to propagate a signal light from a first end of the optical fiber to a second end of the optical fiber. In some embodiments, the signal light includes a signal wavelength of between 1950 and 2100 nanometers. In some embodiments, the V-number is less than 3.83. In some embodiments, the core is doped with a concentration of thulium. In some embodiments, the optical fiber includes an inner cladding surrounding the core. In some embodiments, the inner cladding includes a non-circular cross section. In some embodiments, the optical fiber includes an outer cladding surrounding the inner cladding. In some embodiments, the optical fiber is configured to receive the signal light and a pump light. In some embodiments, the pump light has a pump wavelength of between 1900 and 1910 nanometers. In some embodiments, the core is configured to amplify the signal light in response to receiving the signal light and the pump light.

A system is described, in accordance with one or more embodiments of the present disclosure. In some embodiments, the system includes a pump configured to generate pump light. In some embodiments, the pump light has a pump wavelength between 1900 nanometers and 1910 nanometers. In some embodiments, the system includes a seed laser configured to generate a signal light. In some embodiments, the signal light has a signal wavelength between 1950 nanometers and 2100 nanometers. In some embodiments, the system includes an optical coupler configured to spatially overlap the signal light with the pump light. In some embodiments, the system includes an optical fiber. In some embodiments, the optical fiber is configured to receive the signal light and the pump light. In some embodiments, the optical fiber includes a core with a circular cross-section. In some embodiments, the core has a core diameter, a core numerical aperture, and a V-number. In some embodiments, the core diameter is greater than or equal to 20 micrometers. In some embodiments, the core is configured to propagate the signal light from a first end of the optical fiber to a second end of the optical fiber. In some embodiments, the V-number is less than 3.83. In some embodiments, the core is doped with a concentration of thulium. In some embodiments, the optical fiber includes an inner cladding surrounding the core. In some embodiments, the inner cladding includes a non-circular cross section. In some embodiments, the optical fiber includes an outer cladding surrounding the inner cladding. In some embodiments, the core is configured to amplify the signal light in response to receiving the signal light and the pump light.

A system is disclosed, in accordance with one or more embodiments of the present disclosure. In some embodiments, the system includes a memory maintaining program instructions. In some embodiments, the system includes a processor configured to execute the program instructions. In some embodiments, the program instructions cause the processor to determine at least one of a longitudinally-resolved power, a spectrum, an inversion level, or a thermal load information for an optical fiber by iteratively performing one or more steps. In some embodiments, the program instructions cause the processor to solve one or more rate equations for a thulium ion doped in a fused silica host in conjunction with amplified spontaneous emission. In some embodiments, the program instructions cause the processor to calculate an effect of modulation instability on light output by the optical fiber using a solution from one or more rate equations. In some embodiments, the program instructions cause the processor to calculate an optical power provided by the optical fiber including the amplifier spontaneous emission and the modulation instability.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIGS. 3A-3B depict a cross-section of an optical fiber, in accordance with one or more embodiments of the present disclosure.

DETAILED DESCRIPTION

Figure 1:
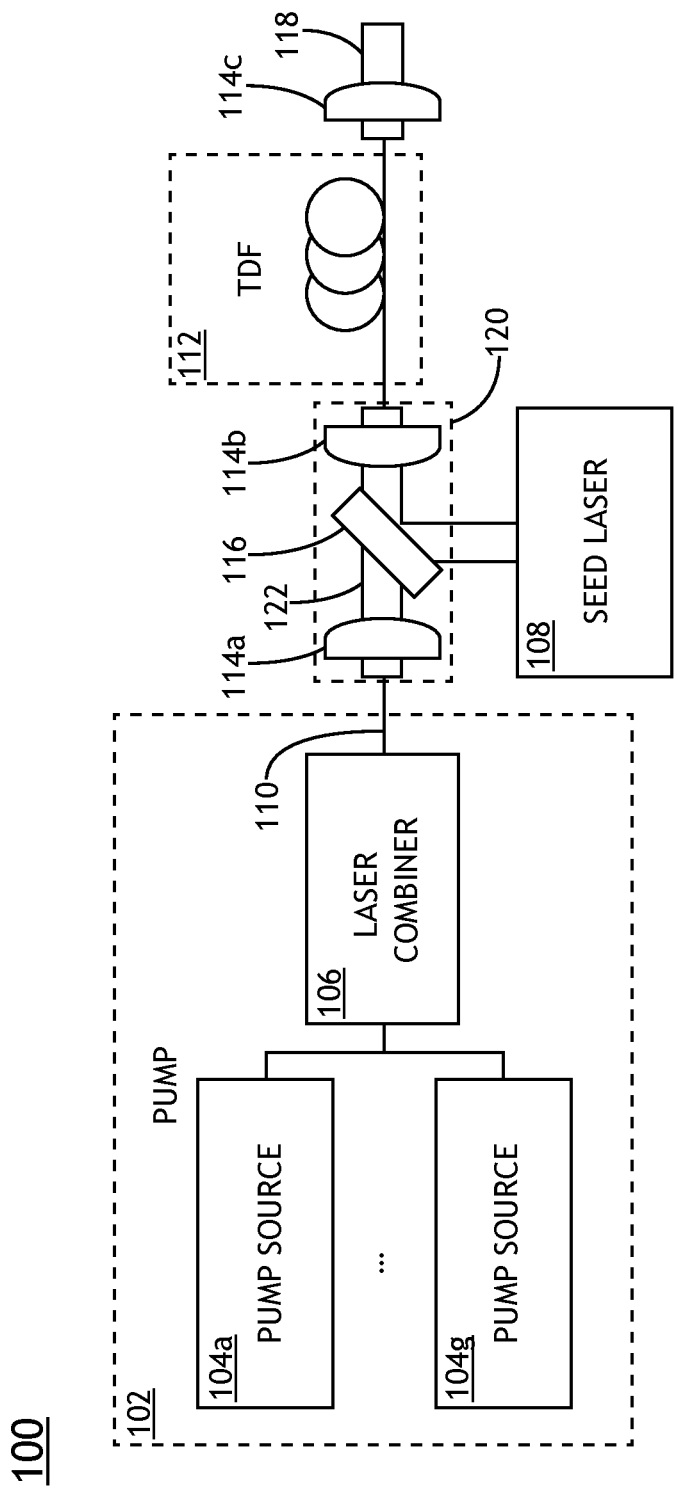
FIG. 1 depicts a simplified schematic view of a system including a multi-kilowatt in-band pumped Tm-doped fiber amplifier, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Thulium doped fiber lasers (TDFLs) have gained much interest recently in the field of directed energy. Thulium doped fiber lasers may be eye safe sources at 2 μm. Current architectures use an optical pumping wavelength of 793 nanometer. However, high thermal loads may occur in the active fiber due to the low efficiencies of 40-60%. The high thermal loads may lead to a thermal degradation of the polymer jacketing of the fiber and is the primary limitation towards scaling to higher powers.

In embodiments, high-power TDFL operation is achieved by pumping directly into the upper laser level, which is referred to herein as in-band pumping. In-band pumping in the 2 μm band allows for optical pumping efficiencies of greater than 80% across most of the operating bandwidth. This high efficiency compared with 793 nanometer diode pumping paves the way towards multi-kilowatt average power generation in the 2 μm band. Besides the benefits afforded by the lower thermal loads at high average power operation, in-band pumping of TDFLs has the advantage avoiding the need for efficient cross-relaxation to obtain high quantum efficiencies.

Pumping directly into the upper laser level can be realized by pumping with erbium-doped fiber lasers (EDFL) near 1.55 micrometer or with TDFLs near 1.9 micrometer. Measurements and simulations have shown that 1908 nanometer pumped TDFLs can reach optical-to-optical efficiencies greater than 80% across a 110-nanometer bandwidth and greater than 90% efficiencies for wavelengths near the pump wavelength. The low quantum defect afforded by pumping directly into the upper laser level also greatly reduces the thermal load in the active fiber as compared to 793 nanometer pumping. In fact, in-band pumping is a method used to generate multi-kW ytterbium-doped fiber lasers (YDFL) by pumping with several shorter wavelength YDFLs.

One method to scale output powers in TDFLs is to increase the doping concentration to improve the CR efficiency. There have been promising results of around 8.5 wt. % thulium-doped fiber (TDF) that produced 75% optical-to-optical efficiencies when pumped at 793 nanometers. However, thulium-doped aluminosilicate glasses are known to suffer from deleterious effects at high Tm-doping concentrations. The deleterious effects may lead to unwanted energy transfer processes such as concentration quenching and energy transfer up conversion. Additionally, such high thulium dopant concentrations further exacerbate aforementioned thermal effects when employing 793 nanometer pumping.

EDFL's operating at around 1.55 micrometer offer an alternative pumping scheme to 793 nanometer diode pumps due to its much higher (>75%) theoretical quantum efficiency. Unfortunately, erbium suffers from many of the same detrimental energy transfer processes as thulium which has historically hindered power scaling. A 656 W EDFL has been demonstrated using a 146/700 micrometer core/cladding fiber. However, the low slope efficiency with respect to absorbed 980 nanometer pump power (35.6%) and the fact that around 25% of the output power was located in the cladding make this system unsuitable for use in pumping a TDF amplifier.

In embodiments, short wavelength, high power TDFL's operating at or near 1.9 micrometers (e.g., 1.9 micrometers to 1.91 micrometers) may be used for in-band pumping of longer wavelength TDFL's near 2 micrometers. TDF's have added advantages over erbium with higher theoretical quantum efficiencies of greater than 90% and historically higher output powers, both of which are useful when considering power scaling a TDFL to the multi-kW level.

"High power resonant pumping of Tm-doped fiber amplifiers in core- and cladding-pumped configurations", by Daniel Creeden et al, is incorporated herein by reference in the entirety.

Embodiments of the present disclosure are directed to thulium-doped fibers (TDF). A comprehensive rate equation model including amplified spontaneous emission (ASE) and modulation instability (MI) is also described. A high power, short wavelength thulium-doped fiber (TDF) laser that may function as a pump unit is also described. A thulium-doped fiber (TDF) amplifier is also described. The TDF amplifier may be described in reference to an expected pump brightness that can be achieved by incoherently combining pump units. The impact of core/cladding ratio, practicality, and nonlinear limitations may be a factor in determining the TDF design. The amplifier efficiency, operating bandwidth, thermal load, and nonlinear limits are modeled for the fiber geometries when pumped at 1908 nanometers. Modeled results for the optical fibers are also described. The results indicate that in-band pumped TDF should permit at or near 6 kW delivery with wavelength tunability from around 1950 to 2100 nanometers.

Referring now to FIG. 1, a schematic layout of a system 100 is described, in accordance with one or more embodiments of the present disclosure. The system 100 may also be referred to as an in-band system architecture. The system 100 may include one or more components, such as, but not limited to, a pump 102, a seed laser 108, an optical fiber 112, aspheric lenses 114, and/or dichroic mirrors 116. The optical fiber 112 may also be referred to as a fiber amplifier, a thulium-doped fiber (TDF), and/or an in-band pumped Tm-doped fiber (TDF) amplifier. In embodiments, one or more components of the system 100 may be optically coupled. The components may be optically coupled in any manner known in the art. The optical coupling may include, but is not limited to, a free-space coupling, fusion splicing, mechanical splices, fiber connectors, and the like.

In embodiments, the pump 102 may be configured to generate pump light. The pump light may have a pump wavelength. The pump wavelength may be between 1900 and 1910 nanometers (e.g., to provide in-band pumping) of the optical fiber 112. This range of the pump wavelength may be selected for a number of reasons. Thulium doped fiber lasers operating below 1900 nanometer may be difficult to manufacture due to gain competition at longer wavelengths. Pump wavelengths longer than 1910 nanometers may be unable to provide enough pump absorption to achieve an efficient amplifier. The pump 102 may be configured to generate the pump light in any suitable manner. The pump 102 may include one or more components for generating the pump light. For example, the pump 102 may include, but is not limited to, one or more pump sources 104 and/or a laser combiner 106.

The pump 102 may include any number of the pump sources 104. For example, the pump 102 may include up to seven or more pump sources 104 (e.g., pump sources 104a-104g). The pump sources 104 may also be referred to as pump units, thulium fiber lasers, and/or low-power fiber lasers. The pump sources 104 may be configured to generate light. The light (e.g., pump source light) may be combined to form the pump light generated by the pump 102. The light may include one or more wavelengths. For example, the fiber lasers may be configured to generate light with a wavelength of 793 nanometers and/or with a wavelength of between 1900 and 1910 nanometers. In embodiments, the pump sources 104 may include thulium fiber lasers. The pump sources 104 may include any suitable power. The number and/or power of the pump sources 104 may be selected to achieve a desired characteristic for the pump light of the pump 102. The power of the pump sources 104 may be up to 300 watts, or more. For example, the pump sources 104 may be a 300-watt class TDF laser. As an illustration, the pump 102 may include seven pump sources 104 which each generate pump source light with a power of up to 300 watts at the pump light wavelength (e.g., 1900 to 1910 nanometers). In this configuration, the pump source light may then be combined to form the pump light with a power of up to 2.1 kilowatts at the pump wavelength.

However, it is to be understood that the pump 102 may generally include any number or combination of pump sources 104 arranged to provide pump light with any suitable power. The pump source 104 may include one or more components, as will be described further in reference to FIG. 2.

The laser combiner 106 may be optically coupled to the pump sources 104. The laser combiner 106 may receive the light from the pump sources 104 by the optical coupling. The laser combiner 106 may be configured to combine (e.g., incoherently combine) the light from the pump sources 104. The light may be combined to generate the pump light. The laser combiner 106 may be optically coupled to any number of the pump sources 104. For example, the laser combiner 106 may be optically coupled to seven of the pump sources 104. The laser combiner 106 may be referred to as a N×1 laser combiner where the laser combiner 106 is optically coupled to a selected number (N) of the pump sources 104. As an illustration, the laser combiner 106 may have a 7×1 geometry that accepts 7 inputs and provides one output. Any N×1 laser combiner (N inputs, 1 output) may be used here as required to accommodate however many pump units are to be used. However, the 7×1 architecture may be advantageous due to ease of manufacture. Advantageously, multiple lower power 793 nanometer pumped thulium fiber lasers may be incoherently combined using the laser combiner 106. The laser combiner 106 may couple light into a smaller core (e.g., as compared to a core of a pump combiner 204), glass clad fiber. Coupling light into the smaller core, glass clad fiber may be different than a traditional pump/signal combiner which couples light from the N inputs into a large mode area, low index polymer clad fiber. Coupling the light into the smaller core, glass clad fiber may allow the laser combiner to provide a higher brightness than the pump/signal combiner. For example, an incoherently combined output of the laser combiner 106 may be a factor of 10 or more larger than an output of the pump combiner (e.g., pump combiner 204). Coupling the light into the smaller core, glass clad fiber may also allow the laser combiner to reduce any deleterious interactions between the pump light (e.g., at a wavelength of 1900 to 1910 nanometers) and the low index polymer coating.

It is contemplated herein that using a laser combiner 106 to combine pump source light from multiple pump sources 104 may allow the system 100 to spread out an overall heat load across multiple pump sources 104. For example, each pump source 104 may include a dedicated heat sink to dissipate a portion of the head load associated with the generation of the pump source light. Further, combining the pump source light from multiple pump sources 104 with a laser combiner 106 may generally increase a total pump power provided, which may enable sufficient gain in the optical fiber 112 which is required to generate output light from the optical fiber 112 with a selected power.

As used herein, numerical aperture may refer to a dimensionless number that characterizes a range of angles over which a component may accept or emit light.

The laser combiner 106 may provide combined pump light from multiple pump lasers 104 using any technique known in the art. In some embodiments, the laser combiner 106 provides the combined pump light through a beam delivery fiber 110. The beam delivery fiber 110 may include any geometry. The geometry of the beam delivery fiber 110 may be selected such that an output optical field distribution from the laser combiner 106 is supported by an inner pump cladding of the optical fiber 112, which may prevent loss. For example, the beam delivery fiber 110 may include a 100-micrometer diameter with a numerical aperture (NA) of 0.22. The 100-micrometer diameter, 0.22 NA beam delivery fiber described is not intended as a limitation of the present disclosure. The beam delivery fiber 110 may include any geometry suitable for output distribution for providing pump light for the optical fiber 112. However, the 100-micrometer diameter, 0.22 NA beam delivery fiber may be advantageous due to manufacturing capabilities/tolerances. In embodiments, the beam delivery fiber may be a Nufern™ BD-S100/120/360-STN fiber.

The system 100 may include the seed laser 108. The seed laser 108 may be optically coupled to the optical fiber 112 by the beam delivery fiber 110. The seed laser 108 may be configured to generate a signal light. The term signal light may refer to light from the seed laser 108. The signal light may include one or more signal wavelengths. The term signal wavelength may refer to a wavelength of light designated as a signal light. For example, the seed laser 108 may be configured to generate signal light with a wavelength of between 1950 and 2100 nanometers. The wavelength range of between 1950 and 2100 nanometer may be chosen based on the thulium ion (Tm3+) gain spectrum. The available laser gain bandwidth covers approximately the 1950 to 2100 nanometer band when pumping in the 1900 to 1910 nanometer band. The wavelength range of between 1950 to 2100 nanometers may provide high gain without issues related to amplified spontaneous emission. Also, wavelengths shorter than 1950 nanometer may not experience efficient amplification due to their proximity to the pump wavelength which may be energetically problematic.

The seed laser 108 may be configured to generate the signal light with a power. The power may also be referred to as an average power. The power may include a range of values. In embodiments, the signal light includes a power of between 10 and 200 watts at the signal wavelength (e.g., 1950 to 2100 nanometers). For example, the signal light may include a power of up to 150 watts at the signal wavelength (e.g., 1950 to 2100 nanometers), although this is not intended to be limiting. In embodiments, the power may be selected based on an amplification within the optical fiber 112. A gain value of 20 decibels (dB) or less may be used when the optical fiber 112 amplifies the signal light to high powers. The gain value of 20 decibels (dB) or less may be used to minimize the growth of amplified spontaneous emission. Therefore, the power of the signal light may be selected such that the optical gain in the optical fiber is 20 decibels (dB) or less.

Incoherent seed lasers may increase the efficiency of modulation instability (MI). In embodiments, the seed laser 108 may be considered a coherent seed source used to seed the optical fiber 112. The seed laser 108 may deliver greater than 50 watts in the wavelength range of between 1950 to 2100 nanometer. The seed laser 108 may be highly coherent.

In some embodiments, the seed laser 108 has a phase-modulated bandwidth. For example, the seed laser 108 may include a phase-modulated bandwidth selected to suppress stimulated Brillouin scattering (SBS) such as, but not limited to, a bandwidth greater than 8 GHZ.

The length of the optical fiber 112 may be optimized to suppress modulation instability (MI). For example, the length of the optical fiber 112 may be optimized to suppress modulation instability (MI) for greater than 5 kW output powers. As used herein, output power may refer to continuous wave (CW) output power. In embodiments, the seed laser 108 may be spectrally filtered prior to amplification. Filtering the seed laser 108 prior to amplification may remove any residual amplified spontaneous emission (ASE) that would seed the modulation instability (MI) process. These seed parameters may be realized with a linewidth-broadened diode amplified through a large mode area (LMA) thulium doped fiber (TDF) and spectrally filtered at the output.

The system 100 may utilize any technique for inserting both signal light and pump light into the optical fiber 112 including, but not limited to, a free-space coupling technique or a fiber coupling technique. In some embodiments, the system 100 includes a beam combiner 120 to spatially overlap the signal light with the pump light. The beam combiner 120 may include any combination of components suitable for spatially overlapping signal light and pump light, such as, but not limited to, an optical coupler, a dichroic mirror, a beam combiner, a polarization combiner, fiber connectors, and the like. For example, FIG. 1 illustrates a non-limiting configuration of the beam combiner 120 providing spatial overlap between signal light and pump light using a free-space coupling technique. In FIG. 1A, the beam combiner 120 includes a dichroic mirror 116 to spatially overlap pump light and signal light. In particular, FIG. 1A illustrates a lens 114a to collimate a pump light 122 exiting a beam delivery fiber 110 prior to the dichroic mirror 116 and another lens 114b to focus the combined pump and signal light to an input face of the optical fiber 112 (e.g., into a core and/or interior cladding of the optical fiber 112 as described in greater detail below). The lenses 114a, 114b may include any type of lenses known in the art including, but not limited to, aspheric lenses.

The optical fiber 112 may also be referred to as a high-power TDF amplifier. In embodiments, the optical fiber 112 is designed with low quantum defect heating. Various embodiments of the optical fiber 112 will be further described herein. In embodiments, the optical fiber 112 may be a triple-clad fiber (e.g., including a polymer jacketing, an outer cladding, an inner cladding, and a core). The optical fiber 112 may be configured to receive the signal light and the pump light (e.g., by free space coupling, fiber coupling, or any suitable technique). The optical fiber 112 may also include one or more properties by which the optical fiber 112 is configured to amplify the signal light using the pump light. For example, a core of the optical fiber may absorb pump light along the length of the optical fiber for amplifying the signal light. The optical fiber may amplify the signal light in response to receiving both of the signal light and the pump light. The optical fiber may be configured to amplify the signal light up to a multi kilowatt average power level.

In embodiments, the optical fiber 112 may be designed to support one or more modes. A mode may refer to a guided optical field which propagates within a material without significant loss. The number of modes may be dependent upon a number of factors, such as, but not limited to, wavelength and dimensions of the optical fiber 112. The optical fiber 112 may be designed to support a core mode. In the core mode, the core may be configured to propagate a signal light at a signal wavelength from a first end of the optical fiber to a second end of the optical fiber. For example, the signal wavelength may be between 1950 and 2100 nanometers. The optical fiber 112 may be designed to support a cladding mode. In the cladding mode, an inner cladding of the optical fiber 112 may be configured to receive pump light at a first end. For example, the pump wavelength may be between 1900 and 1910 nanometers such that the pump wavelength is in-band with the signal wavelength. The pump light may be propagated from the first end along all or a portion of the optical fiber. Where the pump light is propagated to the second end, the pump light may be referred to as unabsorbed pump light or radiation. Alternatively, the pump light may not be propagated to the second end such that all of the pump light may be absorbed.

In embodiments, the optical fiber 112 may amplify the signal light using in-band pumping. One advantage of in-band pumping is to distribute the majority of the thermal load across multiple, lower power pump lasers. Compared with 793-nanometer pumped TDF amplifiers where nearly the entire thermal load resides in the final amplifier, in-band pumped amplifiers benefit from spreading the thermal load across the numerous pump units. Spreading the thermal load across the numerous pump units may prevent thermal failure in the optical fiber 112. The optical fiber 112 may include a maximum output power. The maximum output power may be at near 6 KW for a pump light of 1908 nanometers.

It is contemplated that a rate of pump absorption in the core may impact a length of the optical fiber required to absorb the pump light from the pump lasers 104. The pump absorption may refer to an absorption of pump light by the core for amplifying the signal light. For example, the pump absorption may be between 0.5 and 0.8 dB/m. The fiber length may become excessive if the pump absorption is significantly lower than 0.5 dB/m. Excessive fiber length may increase nonlinear optical effects. The increase in nonlinear optical effects may degrade the overall performance of the system 100. Low pump absorption values and long fiber lengths may also lead to excess passive background loss. The passive background loss may be due to intrinsic absorption of the signal light by the silica glass host. The intrinsic absorption may cause additional heating of the fiber on top of quantum defect heating. The passive background loss may also reduce the power scaling potential of the fiber.

In embodiments, the system 100 is configured to discriminate an amplified signal light from unabsorbed pump radiation. The system 100 may discriminate the amplified signal light from unabsorbed pump radiation using any suitable optical fiber device, such as, but not limited to, an optical filter, absorptive filter, a dichroic mirror, an interference filter, and the like. In embodiments, the system 100 may include one or more dichroic mirrors (not depicted) at an output of the optical fiber 112. The dichroic mirrors at the output of the amplifier may discriminate the amplified signal light from unabsorbed pump radiation. For example, the dichroic mirrors may be after the aspheric lens 114*c* in an output of the optical fiber. Although the system 100 is described as including the dichroic mirrors, this is not intended as a limitation of the present disclosure. It is contemplated that any optical filter may be suitable for filtering the unabsorbed pump radiation.

In embodiments, low OH-optics may be used to mitigate thermal lensing within an active and/or passive fiber host material as well as in a dichroic mirror and aspheric lens. The low OH-optics may include, but is not limited to, Infrasil™ or Suprasil™.

In embodiments, the system 100 may include one or more optics to modify and/or filter output light from the optical fiber 112. For example, FIG. 1 illustrates an additional lens 114*c* to collimate an amplified signal light 118 output from the optical fiber 112. The amplified signal light 118 may refer to the signal light which has been amplified by the pump light within the optical fiber 112. Further, although not shown, the system 100 may include one or more filters (e.g., spectral filters) suitable for discriminating the amplified signal light from unabsorbed pump radiation.

Figure 2:
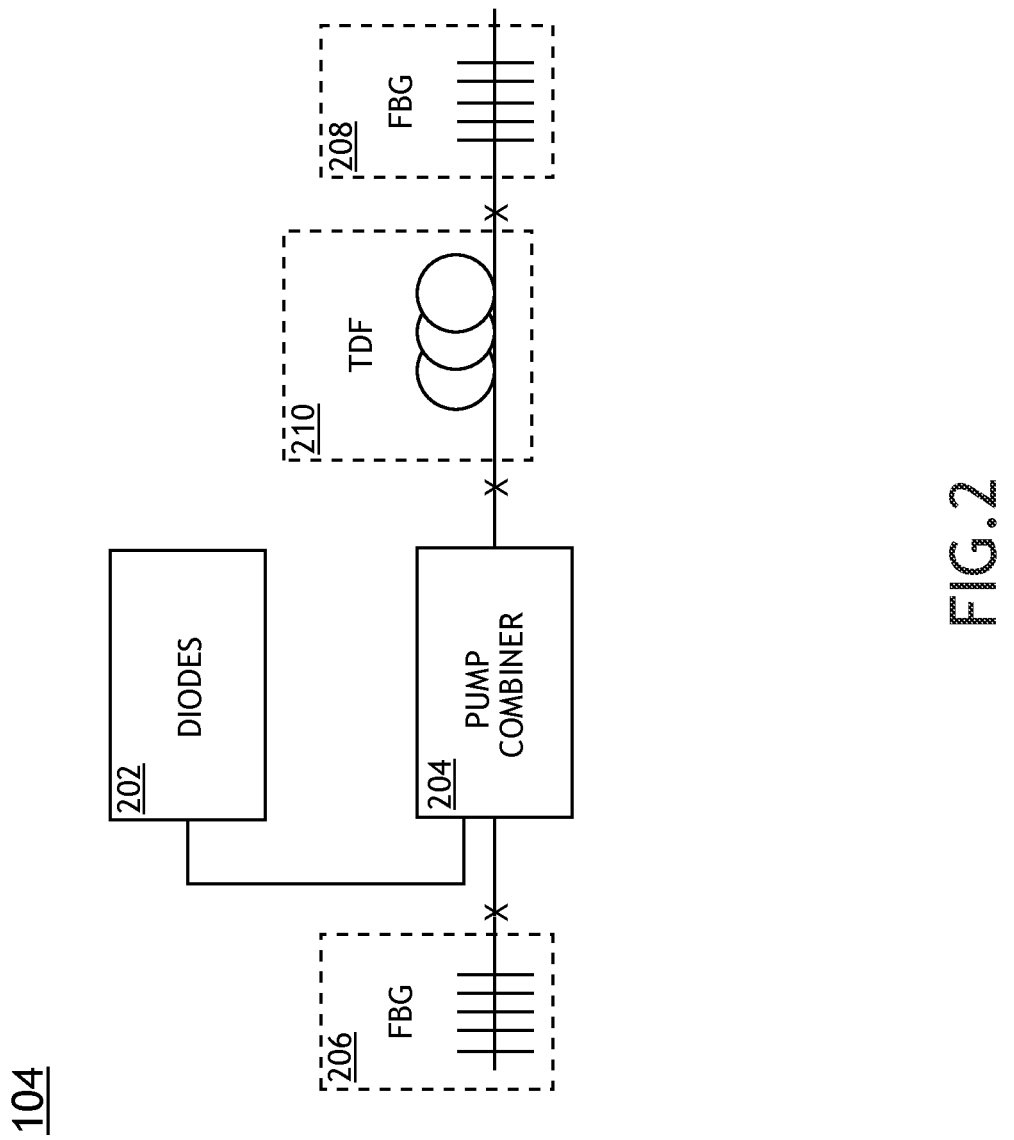
FIG. 2 depicts a simplified schematic of a pump for pumping a multi-kilowatt in-band bumped Tm-doped fiber amplifier, in accordance with one or more embodiments of the present disclosure.

Referring now to FIG. 2, a simplified schematic of the pump source 104 is described, in accordance with one or more embodiments of the present disclosure. As described previously herein, the pump 102 may include any number of pump sources 104 having any design. In some embodiments, the pump 102 includes one or more components to directly generate pump light (e.g., having a wavelength in a range of 1900 to 1910 nanometers). In some embodiments, a pump source 104 may be formed as a laser system such as, but not limited to, a TDF laser to generate the pump light. In embodiments, a pump source 104 may include an all-fiber design. The pump source 104 may include one or more components, such as, but not limited to, one or more diodes 202, pump combiner 204, fiber Bragg gratings (e.g., FBG 206, FBG 208), and/or thulium-doped fiber (TDF) 210.

Such a pump source 104 may include any number of the diodes 202. The diodes 202 may be any type of diode known in the art including, but not limited to, commercially available diodes. The diodes 202 may be configured to generate light (e.g., diode light). The light from the diodes may be combined to generate the light (e.g., pump source light) of the pump source 104. The light may include a power and/or brightness at a given wavelength. For example, the diodes 202 may be configured to generate light with a power of up to 600 watts at a wavelength of 793 nanometers. The diodes 202 may include a diameter of 220 micrometers with a numerical aperture of 0.22. In embodiments, the diodes 202 may be combined to produce greater than 300 watts at 1908 nanometers. The pump source 104 may produce an output brightness of around 1.13 mm-mrad. As may be understood, the various examples of the diameter, the numerical aperture, the power, and the output brightness of the pump source 104 is not intended to be limiting but are merely exemplary based on one or more experimental architectures.

In some embodiments, a pump source 104 includes a pump combiner 204 optically coupled to one or more of the diodes 202. The pump combiner 204 may receive and combine light from the diodes 202. The pump combiner 204 may be configured to combine the light from the diodes 202. The pump combiner 204 may be optically coupled to any number of the diodes 202. The pump combiner 204 may be referred to as a (N+1)×1 pump combiner where the pump combiner 204 is optically coupled to a selected number (N) of the diodes 202. For example, the pump combiner 204 may be optically coupled to six of the diodes 202. The pump combiner 204 may be referred to as a (6+1)×1 pump combiner where the pump combiner 204 is optically coupled to six of the diodes 202. A (6+1)×1 pump combiner may refer to a pump combiner configured to combine six pump diodes and one signal channel into one double cladding output fiber. In this geometry, a pump combiner couples pump light into a lower brightness outer cladding while signal light is coupled into a high brightness fiber core. The (6+1)×1 geometry of this combiner is not required. Any (N+1)×1 pump combiner (N inputs, 1 signal channel, 1 output) may be used as required to accommodate however many diodes are to be used. Advantageously, the pump combiner 204 may be used to create a high-power output. The pump combiner 204 may be optically coupled to the FBG 206. Additionally, the pump combiner 204 may be optically coupled to the TDF 210. The diode light may be combined where the pump combiner 204 includes six of the diodes each configured to generate diode light with a power of up to 600 watts at a wavelength 793 nanometers, such that the pump combiner 204 is configured to generate the pump source light with the power of up to 300 watts at the signal light between 1900 and 1910 nanometers.

The FBG 206 may be referred to as a high-reflectivity (HR) fiber Bragg grating. The FBG 206 may include a reflectivity (R) of 99 percent or greater. The FBG 206 may include an optical fiber with a core and a cladding which may each include a diameter. For example, the core may include a diameter of 25 micrometers. By way of another example, the cladding may include a diameter of 250 micrometers.

The FBG 208 may be referred to as an output coupler or a low-reflectivity (LR) Bragg grating and may have any suitable reflectivity such as, but not limited to, at or near 15 percent. The FBG 208 may include an optical fiber with a core and a cladding which may each include a diameter. For example, the core may include a diameter of 25 micrometers. By way of another example, the cladding may include a diameter of 400 micrometers.

Thus, the pump source 104 may include pairs of low-reflectivity (LR) and high-reflectivity (HR) fiber Bragg gratings (FBG). FBG reflectivity of HR greater than 99% and LR at or near 15% may be used for optimal performance based on modeling. The FBG 206 and the FBG 208 may include any structure for an FBG, such as, but not limited to, a uniform fiber Bragg grating. The pair of FBGs may be used to form an oscillator and/or a laser cavity.

The TDF 210 may include a core and a cladding. Each of the core and the cladding may include a diameter. For example, the core may include a diameter of 25 micrometers. By way of another example, the cladding may include a diameter of 400 micrometers. Each of the core and the cladding may include a numerical aperture (NA). For example, the core may include a numerical aperture of 0.09. By way of another example, the cladding may include a numerical aperture of 0.46. For instance, the TDF 210 may be referred to as a 25/400 micrometer diameter, with 0.09/0.46 numerical aperture (NA). The TDF 210 may be optically coupled to the pump combiner 204. The TDF 210 may be configured to receive combined light by the optical coupling to the pump combiner 204. The TDF 210 may be optically coupled to the FBG 208.

The pump source 104 may provide a brightness defined by the various components described. Given the output brightness of each of the pump lasers 104 (around 1.13 mm-mrad), seven 300 W pump lasers are estimated to be able to be combined into a 100 μm/0.22 NA delivery fiber. At a combined power of 2.1 KW in the 1900-1910 nanometer band, in the 100 μm/0.22 NA delivery fiber, an output pump brightness of at or near 0.6 W/μm^2 is expected. As may be understood, the pump brightness is not intended to be limiting. The pump brightness will increase proportionally with higher power pump lasers approaching the 1 KW level.

Figure 3B:
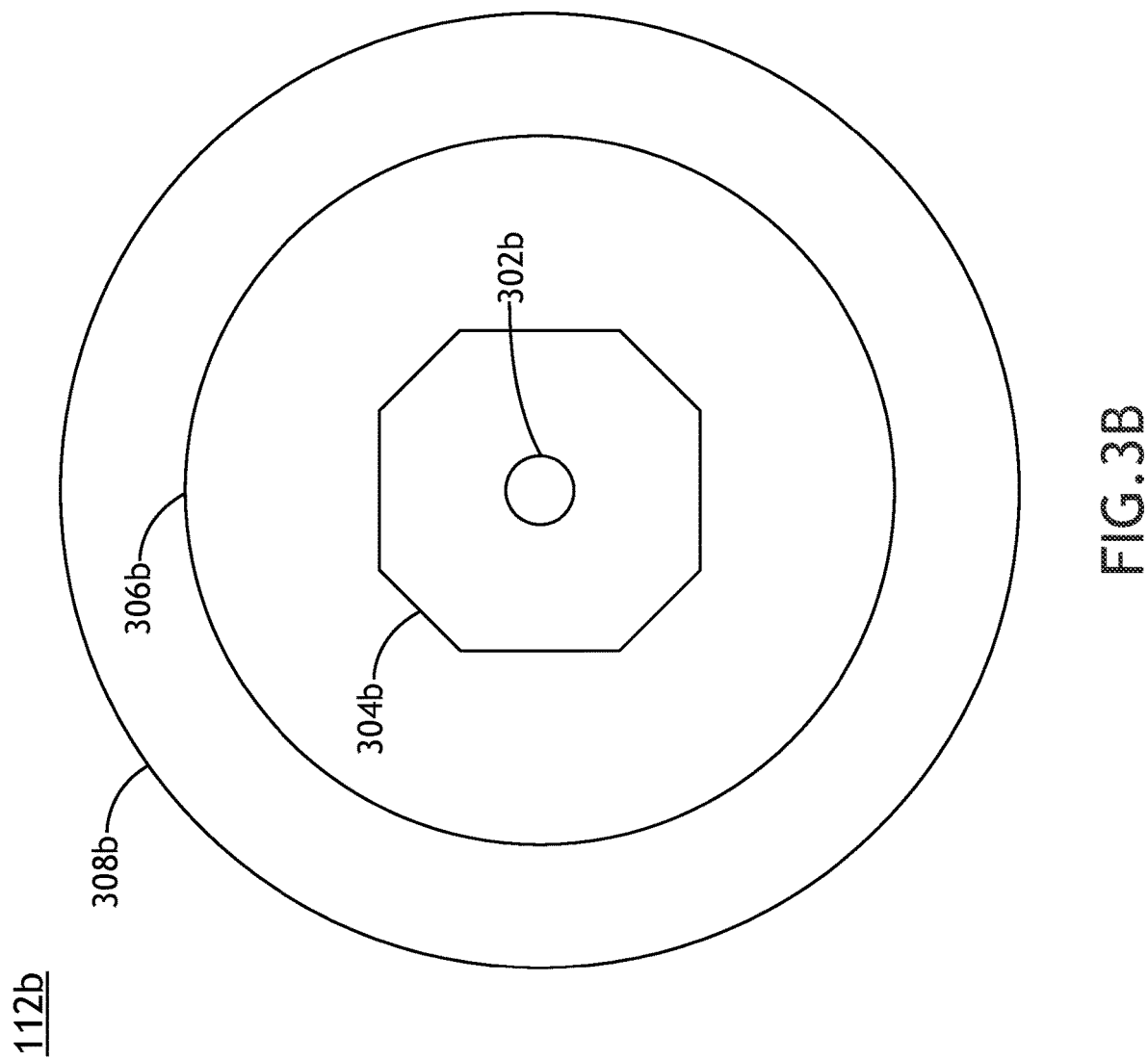

Referring generally to FIGS. 3A-3B, a cross-section of the optical fiber 112 is described, in accordance with one or more embodiments of the present disclosure. The optical fiber 112 may include a core 302, an inner cladding 304, an outer cladding 306, and/or a polymer coating 308. The optical fiber 112 may also be referred to as a triple clad fiber. Each of the core 302, the inner cladding 304, and the outer cladding 306 may be formed of a glass material. The optical fiber 112 may be configured as a triple-clad fiber by the three layers of glass. The glass material may include, but is not limited to, silica glass. As may be understood, each of the layers may include a separate dopant, dopant concentration, numerical aperture, and/or index of refraction. An all-glass pump cladding architecture with a relatively small diameter may be used when pumping in the 1.9 micrometer region. The all-glass pump cladding architecture may be used due to the intrinsic absorption of light at or near 1.9 μm by conventional low-index fluoroacrylate coatings used in double clad fibers.

Although not depicted, the optical fiber 112 may include a length of the cross-section. The length of the optical fiber 112 may be defined from a first end to a second end of the optical fiber. The optical fiber 112 may propagate the signal light and/or the pump light from the first end to the second end through the cross-section along the length of the fiber. The fiber length may determine the level of optical nonlinearities that will be encountered. The fiber length may determine the optical nonlinearities within the optical fiber 112 because nonlinear optical thresholds may scale with fiber length. Thus, reducing a length of the optical fiber 112 may be desirable for reducing the optical nonlinearities.

A parameter space in which an in-band pumped thulium fiber can be constructed with accompanying justifications for each design parameter are provided. One purpose behind the design is to maximize power scaling potential. The designs described in FIGS. 3A-3B are examples of fiber geometries which are suitable for this purpose. There exists significant room to adjust parameters to engineer the optical fiber for specific applications based on the parameter space described. The parameters may be adjusted to achieve one or more of the following: maximum gain at a particular wavelength, high gain in a short fiber length, pulsed light amplification, and the like. The overall parameter space described aims to provide an exemplary description of suitable parameters for high power, in-band pumped thulium doped fiber amplifiers.

The optical fiber 112 may include the core 302. In embodiments, the core 302 is configured to amplify signal light by pump light. The core 302 may be configured to amplify signal light having a wavelength between 1950 and 2100 nanometers using pump light having a wavelength between 1900 and 1910 nanometers.

The core 302 may include a core numerical aperture and a circular cross-section. The circular cross-section may define a core diameter of the core 302. The choice of core diameter and numerical aperture may be motivated by several factors. One motivating factor in the selection of the core diameter and the numerical aperture is the desire for high beam quality of the amplified output signal.

In embodiments, the core 302 may provide a V-number. The V-number may determine the overall mode content of the core 302 and/or the optical fiber 112. The V-number may also be referred to as a normalized frequency parameter. The V-number may be a derived quantity. The V-number may be proportional to the product of the core diameter and core numerical aperture. For example, the V-number may be determined by, $V=\pi*d*NA/\lambda$, where V is the V-number, d is the core diameter (in meters), NA is the numerical aperture of the core, and λ is the wavelength propagated by the core (in meters). In embodiments, the V-number may be less than 3.83. The V-number may be less than 3.83 to maintain beam quality and/or to ensure the core supports two guided optical modes or less. Therefore, any combination of core diameter and numerical aperture that meet this criterion may be suitable to ensure good beam quality. In embodiments, the core 302 includes a V-number larger than 2.3. The core 302 may avoid excessive losses by the V-number being larger than 2.3. Therefore, the core diameter and numerical aperture may be chosen such that the corresponding V-number falls within the range between 2.3 and 3.83. The core 302 may ensure both high beam quality and low propagation losses by the V-number between 2.3 and 3.83. The core 302 may additionally support no more than two guided optical modes (e.g., exactly two guided optical modes) by the V-number between 2.3 and 3.83. It is further contemplated that the V-number may be lower than 2.3. However, the guided core modes with low core confinement may lead to excessive propagation and bending losses for these modes when the V-number is lower than 2.3.

In embodiments, the core diameter may be greater than or equal to 20 micrometers. The core diameter may include a value, such as, but not limited to, between 20 and 50 micrometers. In embodiments, the core diameter may be between 27 and 40 micrometers. A factor to consider when choosing the core geometry is nonlinear thresholds. Larger mode field diameters may be preferred to avoid nonlinear effects. The larger mode field diameters may be preferred since nonlinear thresholds scale with the fundamental mode field diameter of the fiber. The core diameter may be selected to allow for power scaling to well over 5 kilowatts of average power before nonlinear effects come into play. Core diameters less than 20 microns may give rise to nonlinear effects at lower average powers and may be unsuitable for high average power scaling. Conversely, core diameters greater than 50 microns may begin to degrade the output beam quality and can also lead to higher bend sensitivity of the fiber. The higher bend sensitivity may lead to excess propagation loss. Thus, the core diameter may be selected based on the nonlinear thresholds. It is further contemplated that the core diameter may be greater than 50 micrometers, such that this is not intended as a limitation of the present disclosure.

The core numerical aperture may include a value, such as, but not limited to, between 0.06 and 0.12. In embodiments, the core numerical aperture is between 0.06 and 0.09. The range of numerical apertures may be relatively low compared with many other commercially available thulium fibers. The range of numerical aperture may also give rise to guided core modes with low core confinement. The guided core modes with low core confinement may be advantageous from a nonlinear optical perspective due to higher nonlinear thresholds. In embodiments, the core numerical aperture may be selected to achieve the V-number given the core diameter and the selected wavelength.

The core 302 may be formed of a glass material. The glass material may include, but is not limited to, silica glass. The glass material of the core 302 may be doped with a concentration of thulium. The concentration of thulium may include any suitable value, such as, but not limited to, greater than or equal to $31 \times 10^{25}$ ions/m^3 (e.g., 31E25 ions/m^3). A concentration of thulium which is lower than 31E25 ions/m^3 may lead to pump absorption coefficients which are too small to build an effective amplifier without nonlinear or background loss issues. In embodiments, the concentration of thulium may be between $31 \times 10^{25}$ and $40 \times 10^{25}$ ions/m^3 (e.g., 40E25 ions/m^3). The concentration of thulium which is higher than 40E25 ions/m^3 may lead to absorption values which are too high to enable high average power scaling without thermal failure, which may be particularly likely at wavelengths greater than 2050 nanometers. The thermal failure may also be exhibited below the 2050 nanometers when the concentration of thulium is significantly higher than 40E25 ions/m^3. The thulium dopant concentration may govern the thermal properties. For example, increasing the thulium dopant concentration may cause higher likelihood of thermal failures. The thulium dopant concentration may also govern the refractive index.

The optical fiber 112 may include the inner cladding 304. The inner cladding 304 may surround the core 302. The inner cladding 304 may be formed of a glass material. The glass material may include, but is not limited to, silica glass. The inner cladding 304 may include an inner cladding numerical aperture and a non-circular cross-section. The non-circular cross-section may define an inner cladding diameter. The inner cladding diameter and numerical aperture may be selected based on one or more factors which will be described further herein, such as, but not limited to, achieve a specific pump absorption per unit length, to reduce mode competition, and the like. As used herein, the term surround may be used to refer to a layer of the optical fiber 112 which encases another layer of the optical fiber (e.g., as viewed in a cross-section).

The inner cladding 304 may include the inner cladding diameter and inner cladding numerical aperture. The inner cladding diameter and numerical aperture may be selected to support the pump light. A pump absorption coefficient may be based on the inner cladding diameter. In embodiments, the inner cladding diameter may be at least 1.5 times larger than a core diameter. In embodiments, the inner cladding diameter may be at least three times larger than a core diameter. Mode competition between the cladding mode and the core modes may be avoided by the inner cladding diameter being at least three times larger than a core diameter. A strength of a coupling between a core mode and a cladding mode may increase as the cladding diameter is decreased relative to the core diameter. In some instances, a desired threshold for the coupling strength between the modes may be met where the inner cladding diameter is at least 1.5 times the core diameter. In some instances, the desired threshold for the coupling strength between the modes may be met where the inner cladding diameter is at least 3 times the core diameter. In some instances, the inner cladding diameter may be increased to achieve a desired threshold for the coupling strength. Coupling the core modes into the cladding modes may significantly decrease the amplifier efficiency and overall beam quality of the amplified output signal. Therefore, the inner cladding diameter of at least three times the core diameter may be used to ensure good beam quality from the fiber amplifier. The inner cladding diameter may also be selected to enable sufficient pump absorption per unit length (dB/m) of the optical fiber 112. The pump absorption coefficient may impact the required fiber length to achieve the desired level of amplification. In this regard, a greater pump absorption per unit length may allow for a reduced fiber length. Thus, a greater pump absorption per unit length may be desirable to avoid optical nonlinearities associated with the length of the optical fiber 112. The optical fiber 112 may be modified to increase the pump absorption coefficient at the expense of total pump power. In embodiments, the inner cladding diameter may be greater than or equal to 60 micrometers. In embodiments, the inner cladding diameter may be between 60 and 250 micrometers. In embodiments, the inner cladding diameter may be between 125 and 185 micrometers.

The inner cladding numerical aperture may be selected to ensure robust guidance of the pump light. The inner cladding numerical aperture may be selected to reduce leakage of pump light to the outer cladding 306. Reducing leakage of pump light to the outer cladding 306 may be important because interactions between the pump light and the polymer coating 308 may lead to catastrophic optical damage at high average powers. In embodiments, the inner cladding numerical aperture may be greater than or equal to 0.22. Utilizing a numerical aperture of greater than or equal to 0.22 may reduce potential leakage of pump light from the inner cladding 304 to the outer cladding 306.

In embodiments, the inner cladding 304 may be non-symmetric with the core 302. The non-symmetry may be due to the non-circular cross-section of the inner cladding 304 and the circular cross-section of the core 302. In embodiments, the non-circular cross section is octagonal. The inner cladding diameter may refer to a distance between opposing faces of the octagonal cross-section. Although the non-circular cross section is described as being octagonal, this is not intended as a limitation of the present disclosure. The non-circular cross section may include any non-circular cross-section usable in double or triple clad fibers. For example, the non-circular cross-section may include, but is not limited to, an octagonal cross-section, a rectangular cross-section, an oval cross-section, or another non-circularly symmetric shape. The shape of the inner pump cladding may be non-circularly symmetric to ensure adequate mode mixing and thus pump absorption. Circular claddings may give rise to many optical modes with little to no overlap with the core 302. Providing little overlap between cladding modes and core modes may cause the cladding mode to not participate in the amplification process. By using a non-circular cladding, mode mixing between the cladding mode and the core mode may be achieved. The mode mixing may allow efficient amplification of the signal light by the pump light.

The optical fiber 112 may include the outer cladding 306. The outer cladding 306 may surround the inner cladding 304. The term inner and outer may indicate that the outer cladding 306 may surround the inner cladding 304, such that the inner cladding 304 is within the outer cladding 306. The outer cladding 306 may be formed of a glass material. The glass material may include, but is not limited to, silica glass. The glass may be doped with fluorine. The outer cladding may include pump guidance with a relatively high numerical aperture due to the fluorine doping. The relatively high numerical aperture may allow for high brightness pumping. By doping the outer glass cladding with fluorine, adequate pump guidance can be achieved with greater than 0.22 NA which is adequate for a high brightness pumping approach. The outer cladding may have an outer cladding diameter. The outer cladding diameter may be selected to ensure mechanical robustness and/or create surface area to provide heat dissipation into an active fiber cooling mount (e.g., by way of the polymer coating 308). The outer cladding may include a circular cross-section. The circular cross-section may define a diameter of the outer cladding 306. For example, the outer cladding diameter may include any suitable value, such as, but not limited to, 400 micrometers. The outer cladding numerical aperture may include any suitable value, such as, but not limited to, greater than or equal to 0.46. The outer cladding diameter and numerical aperture may be chosen to ensure adequate heat dissipation into the fiber amplifier cooling mount without risking mechanical failure when bending the fiber. Altering the outer cladding diameter or the numerical aperture may risk thermal or mechanical failure.

The optical fiber 112 may include the polymer coating 308. The polymer coating 308 may provide heat dissipation for the optical fiber 112. The polymer coating 308 may include a relatively low index of refraction (e.g., relative to a glass material of the optical fiber 112). The polymer coating 308 may also be referred to as a low index polymer jacketing. The polymer coating 308 may be formed of any polymer material with a lower refractive index than the outer glass cladding material. The polymer coating 308 may provide heat dissipation into an active fiber cooling mount. Although the optical fiber 112 is described as including the polymer coating 308, this is not intended as a limitation of the present disclosure. However, the polymer coating 308 may be advantageous in improving the strength of the optical fiber 112. For example, the polymer coating 308 may improve the ability of the optical fiber 112 to withstand bending to a given bend-diameter. In embodiments, the optical fiber 112 is configured with a bend-diameter. The bend-diameter may be at or near 10 centimeters. The bend diameter of at or near 10 centimeters may be advantageous for compact packaging and higher order mode bend loss.

The polymer coating 308 may limit a maximum thermal load. The maximum thermal load may be limited to prevent failure of the polymer coating 308. The maximum thermal load may include a value, such as, but not limited to, 190 W/m. The maximum thermal load may allow for adequate cooling of the polymer coating 308. The maximum thermal load may also allow for maintaining a maximum temperature of the polymer coating 308 at less than 85 degrees Celsius.

Two fiber designs will now be described and analyzed within the context of multi-kW average power scaling. The geometries of these two fibers may include performance at high average powers. The geometries may also be selected to minimize the effects of modulation instability. Modulation instability may influence the performance of the optical fibers at high-power levels (greater than 5 KW for fiber 112a and greater than 10 KW for fiber 112b). As may be understood, the exemplary optical fibers are not intended to be limiting. Rather, the exemplary optical fibers are illustrative of two configurations suitable for achieving high output power using in-band pumping.

Referring now to FIG. 3A, an exemplary optical fiber 112a is described, in accordance with one or more embodiments of the present disclosure. The exemplary optical fiber 112a includes a core 302a with a 27-micrometer core diameter. The core 302a may include a 0.09 numerical aperture (NA). The numerical aperture may be chosen ensure practicality of fabrication. The exemplary optical fiber 112a includes an inner cladding 304a with a 125-micrometer inner pump cladding diameter. The inner cladding 304a includes a numerical aperture of 0.22. The 125 µm inner pump cladding may accommodate a 100 µm/0.22 NA delivery fiber coupled to a 7×1 laser combiners. The exemplary optical fiber 112a includes an outer cladding 306a with a 400-micrometer outer glass cladding diameter 400. The exemplary optical fiber 112a includes a polymer coating 308a with a 550-micrometer polymer coating diameter. The exemplary optical fiber 112a may also be referred to as a 27/125/400/550 design.

Referring now to FIG. 3B, an exemplary optical fiber 112b is described, in accordance with one or more embodiments of the present disclosure. The exemplary optical fiber 112b includes a core 302b with a 40-micrometer core diameter. The core 302b may include a 0.06 numerical aperture (NA). The numerical aperture may be chosen to highlight the effect of lowering the core NA and allowing for larger mode area with higher nonlinear thresholds. The exemplary optical fiber 112b includes an inner cladding 304b with a 185-micrometer inner pump cladding diameter. The inner cladding 304b includes a numerical aperture of 0.22. The exemplary optical fiber 112b includes an outer cladding 306b with a 400-micrometer outer glass cladding diameter 400. The exemplary optical fiber 112b includes a polymer coating 308b with a 550-micrometer polymer coating diameter. The exemplary optical fiber 112b may also be referred to as a 40/185/400/550 design.

The exemplary optical fibers 112a, 112b may support two modes with a V-number of less than 3.83 at a signal wavelength between 1950 and 2100 nanometers. The V-number may be beneficial to maximize the effective mode area while remaining below the cutoff frequency for LP02 and LP21 modes. LP02 and LP21 modes may refer to linearly polarized modes of an optical fiber.

The 185 μm cladding may provide the same core/cladding overlap factor as the smaller core fiber. As will be discussed below in FIGS. 4A-9B, the 185 μm cladding may represent a balance between thermal effects, modulation instability threshold, and pump absorption. A maximum pump power of at or near 7.3 KW for the fiber 112a and 16.1 KW for the fiber 112b is expected based on the pump brightness of at or near 0.6 W/μm^2.

Figure 4A:
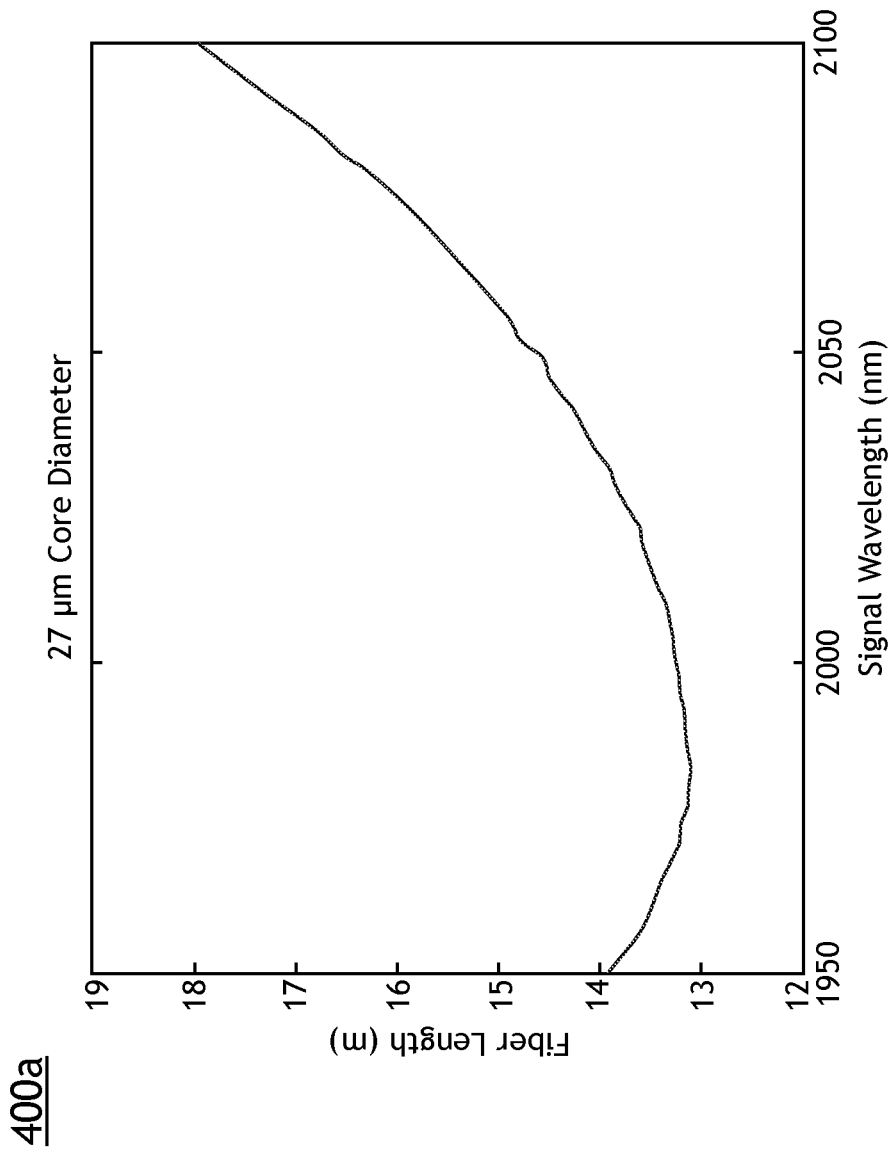
FIGS. 4A-4B depict a graph of fiber length as a function of wavelength for an optical fiber, in accordance with one or more embodiments of the present disclosure.
Figure 4B:
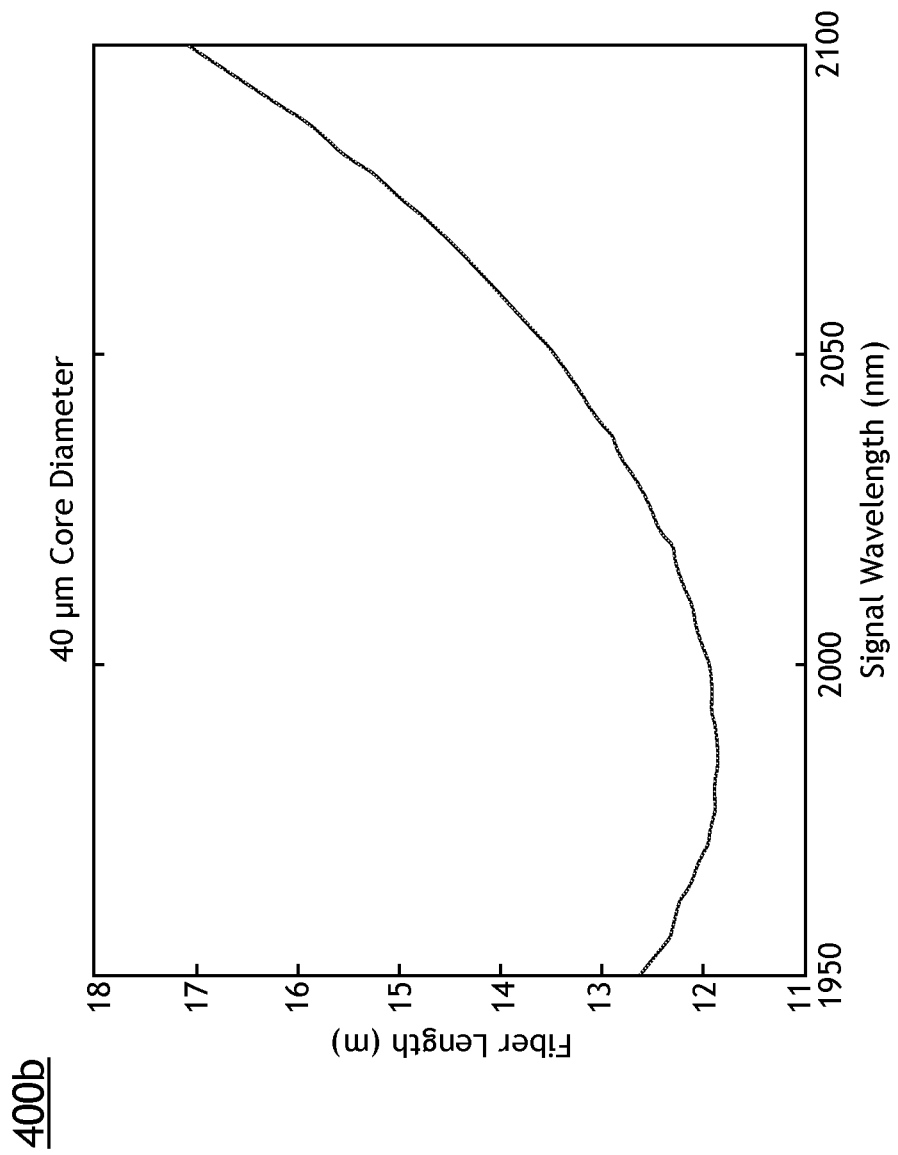

Referring now to FIGS. 4A-4B, a graph of a fiber length as a function of signal wavelength is described, in accordance with one or more embodiments of the present disclosure. Graph 400a depicts fiber length as a function of signal wavelength for the optical fiber 112a with the core diameter of 27 micrometers. Graph 400b depicts fiber length as a function of signal wavelength for the optical fiber 112b with the core diameter of 40 micrometers. The output power of both fibers was simulated while taking into account of thermal limitations and MI to determine the power scaling potential of these fiber geometries. Input pump powers were set at 7.3 KW for the fiber 112a. Input pump powers were set at 16.1 KW fiber 112b. The optimized fiber lengths for both the fiber 112a and the fiber 112b are depicted as a function of signal wavelength. The fiber length has been optimized by finding the fiber length which maximizes the output signal power from the fiber amplifier. The fiber length is optimized because too long of an active fiber may lead to signal light being transferred into amplified spontaneous emission (ASE) and/or modulation instability sidebands via reabsorption. In embodiments, the length of the optical fiber 112a may be between 13 and 18 meters. In embodiments, the length of the optical fiber 112b may be between 12 and 17 meters.

Figure 5A:
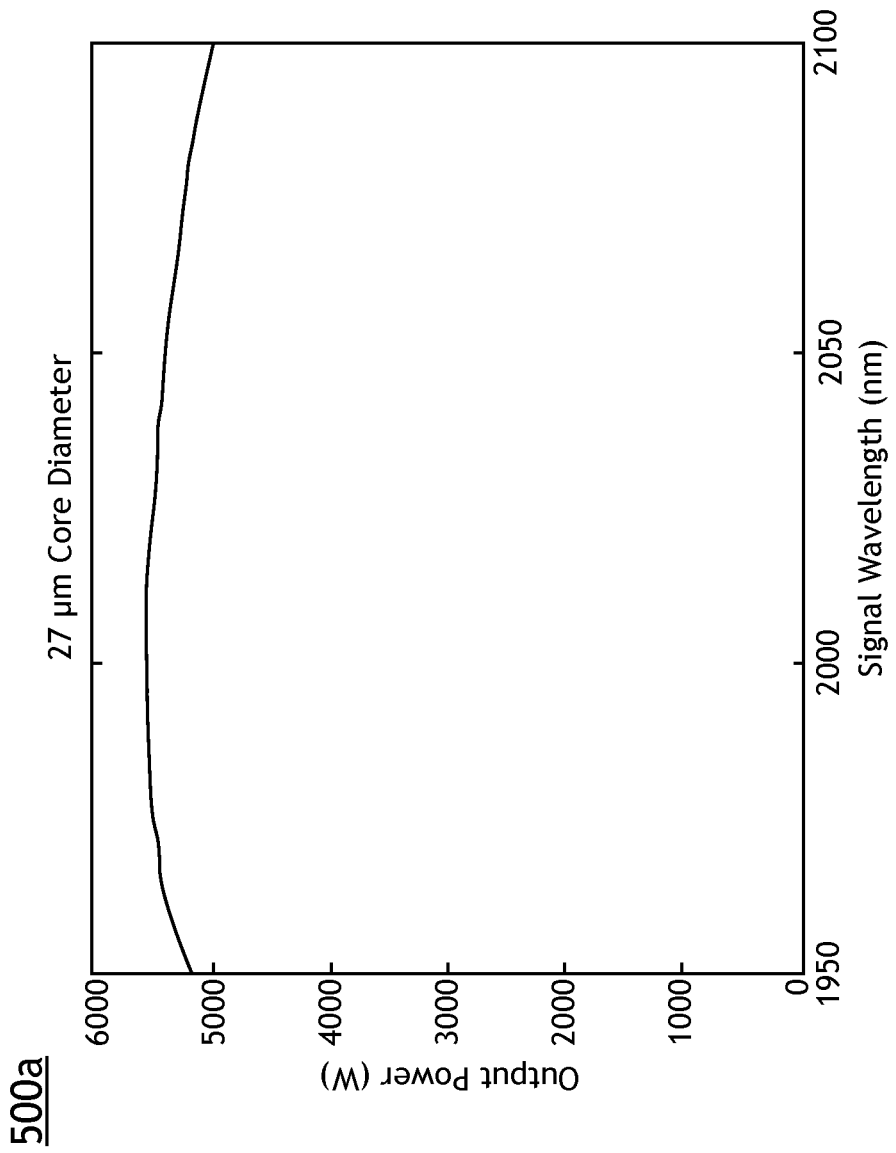
FIGS. 5A-5B depict a graph of output power as a function of wavelength for an optical fiber, in accordance with one or more embodiments of the present disclosure.
Figure 5B:
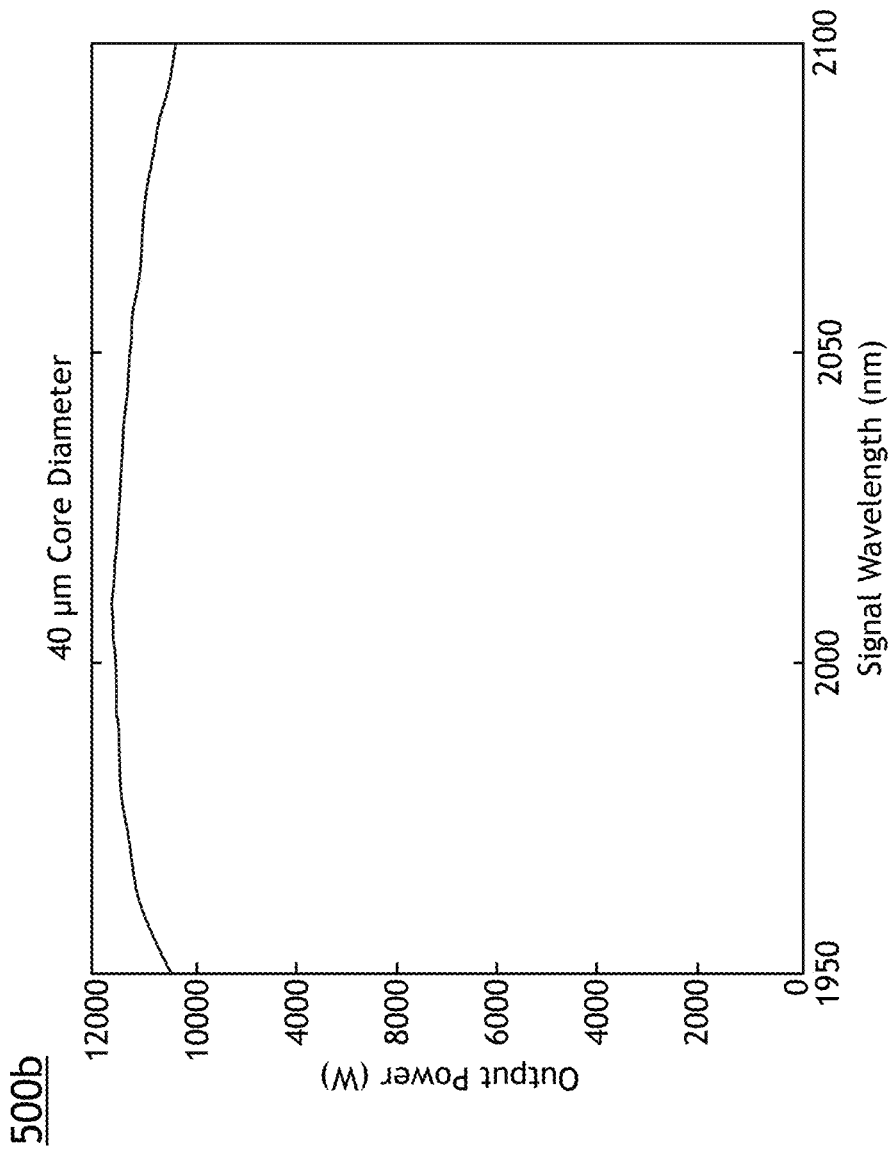

Referring now to FIGS. 5A-5B, a graph of output power as a function of signal wavelength is described, in accordance with one or more embodiments of the present disclosure. Graph 500a depicts output power as a function of signal wavelength for the optical fiber 112a with the core diameter of 27 micrometers. Graph 500b depicts output power as a function of signal wavelength for the optical fiber 112b with the core diameter of 40 micrometers. Both designs are simulated in terms of maximum output power given these optimized fiber lengths from FIGS. 4A-4B. For the purpose of this simulation, the input spectrum consisted of a single tone at the signal wavelength and quantum background noise at all other wavelengths. The effects of amplified spontaneous emission (ASE) on the input spectrum are addressed further herein. The output power is depicted as a function of signal wavelength. The seed was set to 150 W while the pump powers were set to 7.3 KW for the fiber 112. The seed was set to 150 W while the pump powers were set to 16.1 KW for the fibers 112b. As depicted in FIG. 5A, the fiber 112a may generate a maximum of at or near 5.5 kW output power. The fiber 112a may also generate over 5 kW output power across the signal wavelength from 1950 to 2100 nanometers. As depicted in FIG. 5B, the fiber 112b may generate a maximum of at or near 11.6 kW output power. The fiber 112b may also generate over 11 kW output power across the signal wavelength from 1950 to 2100 nanometers.

Figure 6A:
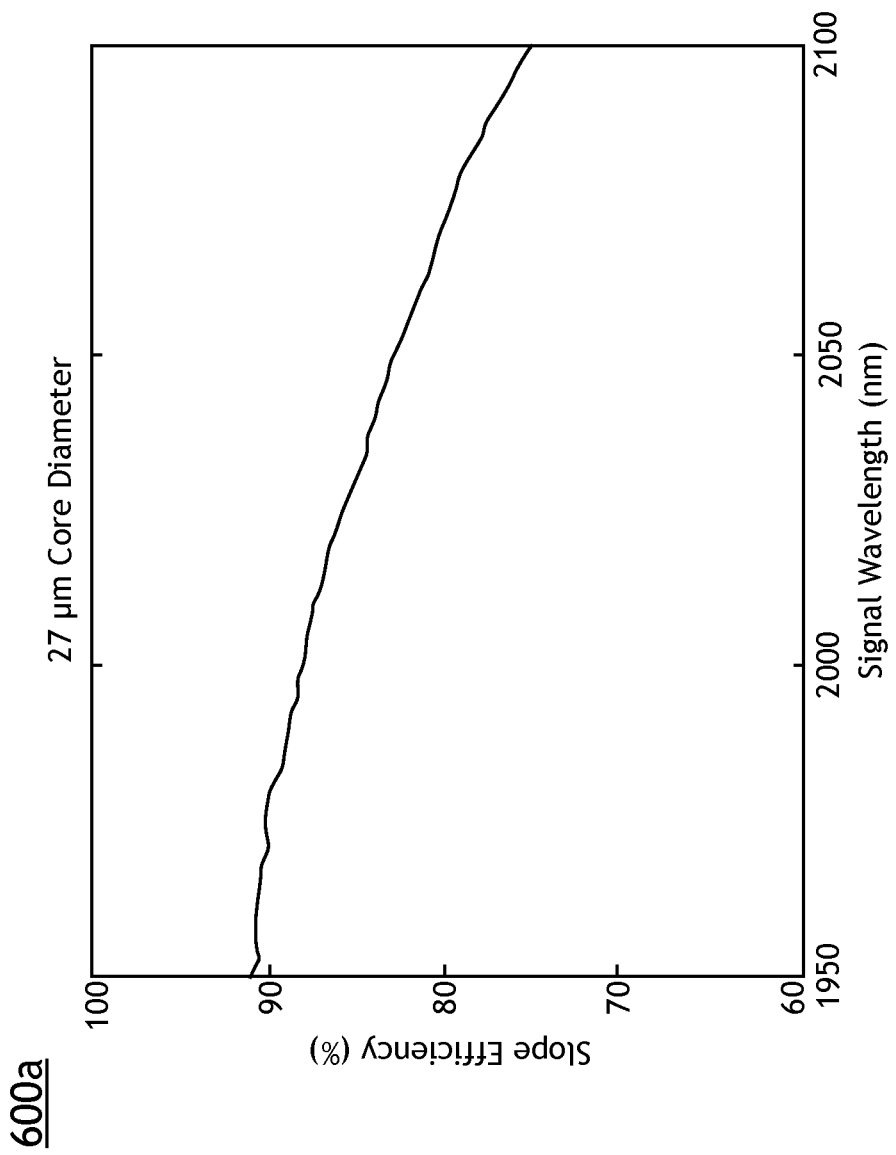
FIGS. 6A-6B depict a graph of slope efficiency as a function of wavelength for an optical fiber, in accordance with one or more embodiments of the present disclosure.
Figure 6B:
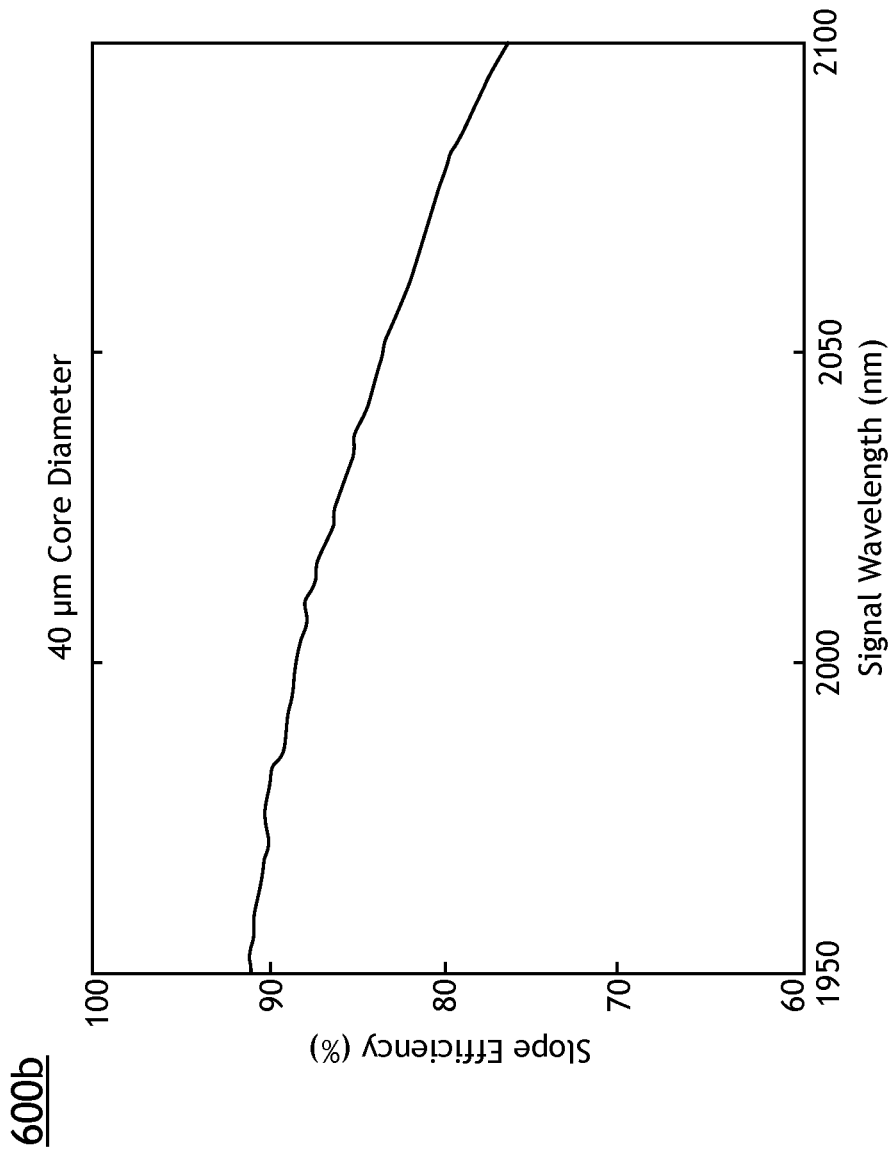

Referring now to FIGS. 6A-6B, a graph of slope efficiency as a function of signal wavelength is described, in accordance with one or more embodiments of the present disclosure. Graph 600a depicts slope efficiency as a function of signal wavelength for the optical fiber 112a with the core diameter of 27 micrometers. Graph 600b depicts slope efficiency as a function of signal wavelength for the optical fiber 112b with the core diameter of 40 micrometers. These graphs may indicate that both proposed fibers can operate efficiently across a broad bandwidth owing to the 1908 nanometer pumping approach. When the wavelength of the signal light is at or near 1950 nanometers, greater than 90% slope efficiency is possible for both the fiber 112a and the fiber 112b. Greater than 70% slope efficiency across the 1950-2100 nanometer operating band (e.g., the signal wavelength of the signal light) is possible for both the fiber 112a and the fiber 112b.

The graphs from FIGS. 5A-6B may demonstrate how in-band pumping opens a pathway to multi-kW TDF lasers that do not suffer from thermal failure.

Figure 7A:
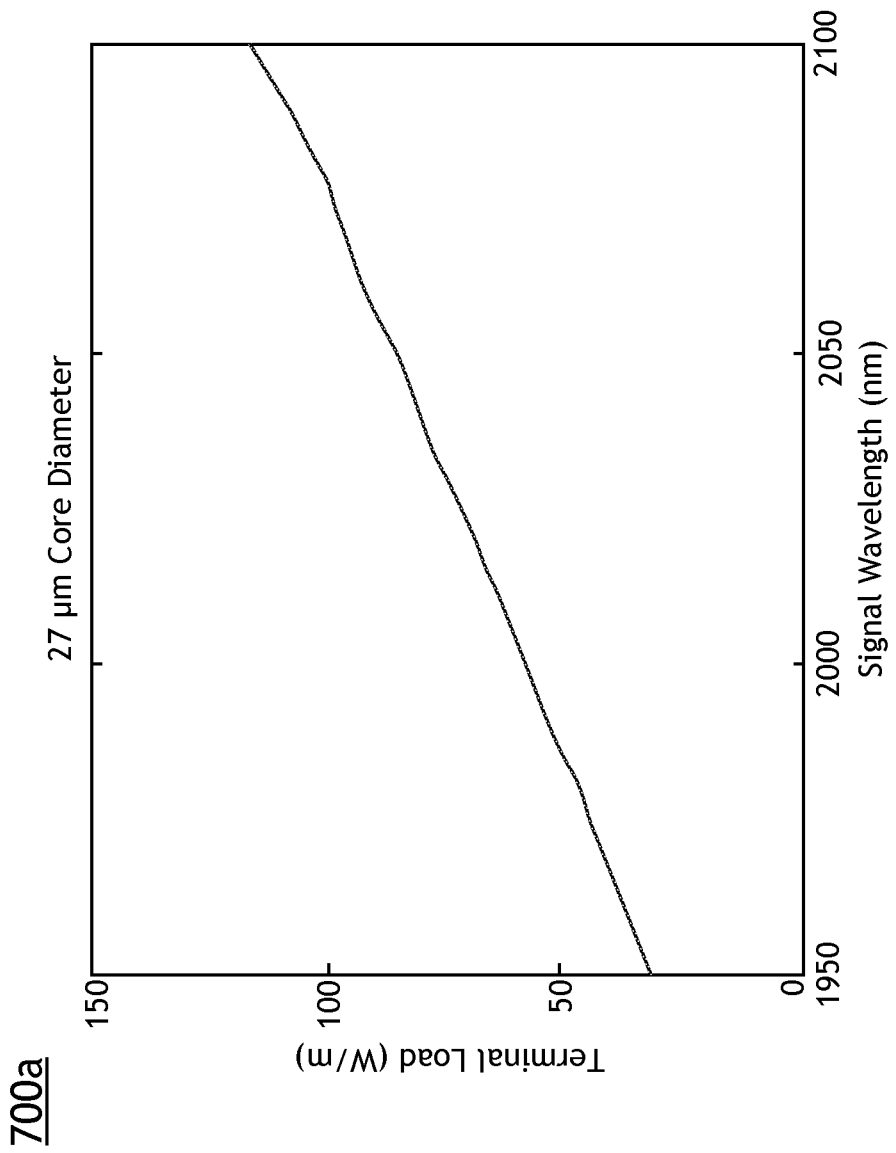
FIGS. 7A-7B depict a graph of thermal load as a function of wavelength for an optical fiber, in accordance with one or more embodiments of the present disclosure.
Figure 7B:
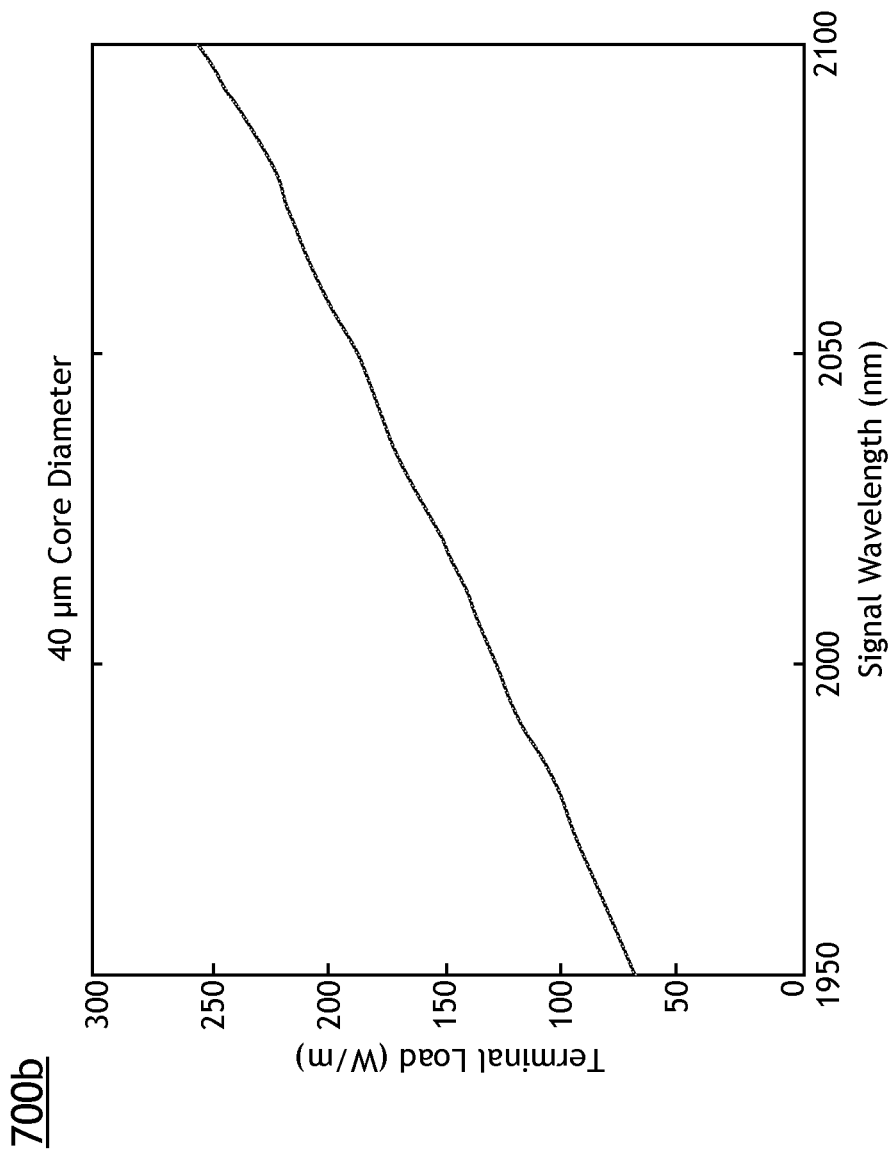

Referring now to FIGS. 7A-7B, a graph of thermal load as a function of signal wavelength is described, in accordance with one or more embodiments of the present disclosure. Graph 700a depicts thermal load as a function of signal wavelength for the optical fiber 112a with the core diameter of 27 micrometers. Graph 700b depicts thermal load as a function of signal wavelength for the optical fiber 112b with the core diameter of 40 micrometers. The thermal load was simulated at maximum pump powers. As depicted in FIG. 7A, the thermal load is manageable with less than 190 W/m peak thermal load even at multi-kW output powers. The fiber 112a may provide greater than 5 KW across the 1950-2100 nanometer region. The 5 KW across the 1950-2100 nanometer region may be provided at less than 190 W/m peak thermal loads. As depicted in FIG. 7B, high thermal loads become an issue at longer wavelengths for the fiber 112b. The high thermal loads may be due to a combination of reduced slope efficiency and background absorption from the silica host. The fiber 112b may have greater than 190 W/m loads at wavelengths greater than 2050 nanometer. The fiber 112b may provide greater than 11 kW output powers from 1950-2050 nanometer region. The 11 kW output powers from 1950-2050 nanometer region may be provided within the peak thermal load of 190 W/m.

In all scenarios, the stimulated Raman scattering (SRS) threshold is always higher than the modulation instability (MI) threshold. Modulation instability (MI) may be a limiting nonlinearity to be considered in fiber amplifiers. The modulation instability (MI) may be limiting due to the stimulated Raman scattering (SRS) threshold being higher than the modulation instability (MI) threshold. The thermal load in both the fiber 112a and the fiber 112b may be very low (e.g., much less than 190 W/m) compared with 793 nanometer pumped systems. The thermal load may be low due to the low quantum defect when in-band pumping. The thermal load may present relatively few limitations towards power scaling.

The seed laser 108 is further described. The seed laser 108 may include one or more spectral characteristics. The spectral characteristics may be selected to suppress simulated Brillouin scattering (SBS) and modulation instability (MI). This is analyzed for the 1908 nanometer pumped amplifier because the fiber length is longer and is more restrictive for nonlinearities than when pumping at wavelengths less than 1908 nanometer. In embodiments, the seed spectral linewidth may be at least greater than 120 times a Brillouin gain bandwidth. For a 17.5 MHz Brillouin gain bandwidth, this means the seed's linewidth should be greater than 2.1 GHZ to suppress simulated Brillouin scattering (SBS) in the amplifier at maximum output power. This simulated Brillouin scattering (SBS) threshold analysis assumed a linearly polarized source. The in-band pumped amplifier is not designed to maintain polarization and therefore the simulated Brillouin scattering (SBS) threshold could be up to around 1.5 times higher.

In embodiments, a seed linewidth at or near 470 times the Brillouin gain bandwidth may be used to ensure safe operation of the TDF amplifier to 6 KW. Therefore, the input spectral linewidth may be greater than 8 GHz to leave room for error and ensure simulated Brillouin scattering (SBS) suppression. Broadening the seed spectral linewidth may be achieved with commercial phase modulators or by seeding with a broadband fiber Bragg gratings-locked fiber oscillator. However, a phase modulated single-frequency source may be used for temporal stability. The phase modulated single-frequency source may improve the temporal stability because fiber Bragg gratings-locked fiber oscillators at 2 μm are prone to self-pulsing.

Figure 8A:
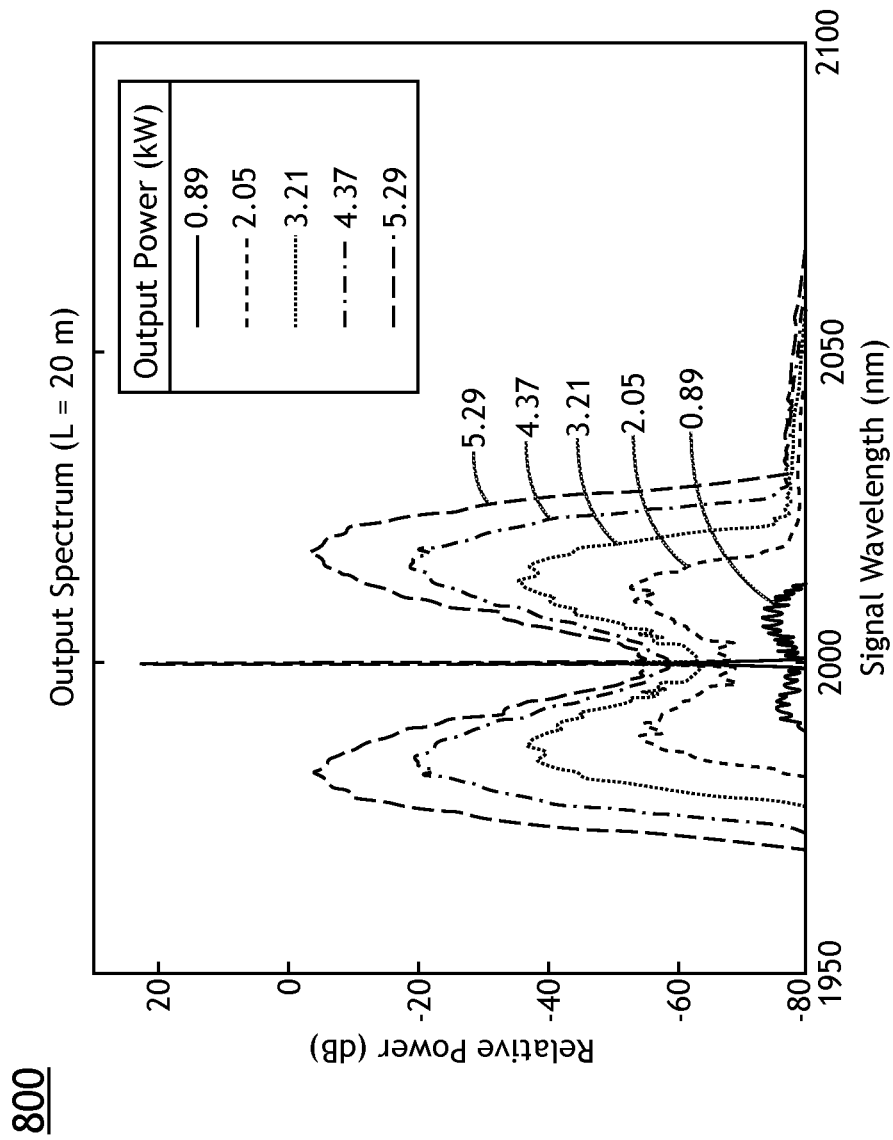
FIG. 8A depicts a graph of relative power in decibels (dB) as a function of wavelength for an optical fiber, in accordance with one or more embodiments of the present disclosure.
Figure 8B:
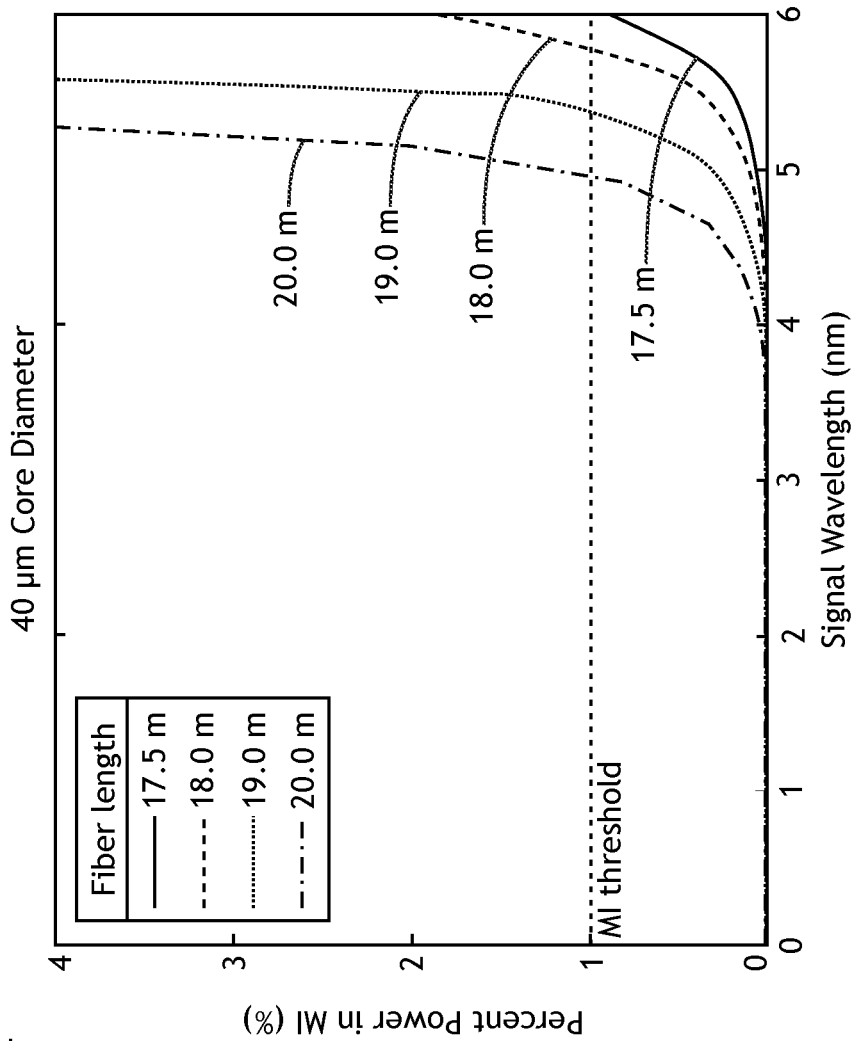
FIG. 8B depicts a graph of percent power in modulation instability as a function of output power for an optical fiber, in accordance with one or more embodiments of the present disclosure.

Referring generally to FIGS. 8A-8B, the impact of modulation instability (MI) on power scaling is examined in detail by using an amplifier model. The model uses random phase for the input amplified spontaneous emission (ASE) noise and averaged ten iterations to calculate the output spectrum and power transferred into the modulation instability (MI) sidebands.

Referring now to FIG. 8A, a graph 800 of a simulated output spectra for different output power levels is described, in accordance with one or more embodiments of the present disclosure. The graph 800 may be for the optical fiber 112a with a length of L=20 and pumped with pump light having a wavelength of 1908 nanometer. The graph 800 may include the following output powers 0.89 KW, 2.05 KW, 3.21 KW, 4.37 KW, and 5.29 kW.

Referring now to FIG. 8B, a graph 802 of a percent power in modulation instability (MI) sidebands as a function of output power is described, in accordance with one or more embodiments of the present disclosure. The graph 802 may be for the optical fiber 112a pumped with pump light having a wavelength of 1908 nanometer. The graph 802 includes a modulation instability (MI) threshold. The modulation instability (MI) threshold may include a 1% modulation instability (MI) threshold, although this is not intended to be limiting. The graph 802 may depict variable lengths of the optical fiber 112a including lengths of 17.5 meters, 18.0 meters, 19.0 meters, and 20.0 meters. The optical fiber may include a percent power at the 1% modulation instability (MI) threshold at a lower power as the length of the fiber increases. For example, the 17.5-meter fiber may reach the 1% modulation instability (MI) threshold at greater than 6 kW, the 18.0-meter fiber may reach the 1% modulation instability (MI) threshold between 5.5 KW and 6 KW, the 19.0-meter fiber may reach the 1% modulation instability (MI) threshold between 5 KW and 5.5 KW, and the 20-meter fiber may reach the 1% modulation instability (MI) threshold between 4.5 KW and 5 KW. The simulations indicate that output powers are limited to a given power for a 1% modulation instability (MI) threshold. Length optimization may be performed on the optical fiber 112 to prevent modulation instability (MI) and maximize output power.

For a maximum 7.3 KW pump power, the output power can be maximized by reducing the fiber length to 17.5 meters. The fiber length of 17.5 may providing greater than 5 kW output power before modulation instability (MI) becomes unmanageable.

The above numerical simulations show how problematic modulation instability (MI) is expected to be for high average power TDF amplifiers. The input signal/idler power was assumed to come from the "quantum noise". The quantum noise may represent the best-case scenario in terms of amplifier performance. However, residual amplified spontaneous emission (ASE) input into the final amplifier stemming from previous seed amplification stages should not be neglected in a laser system.

Figure 9A:
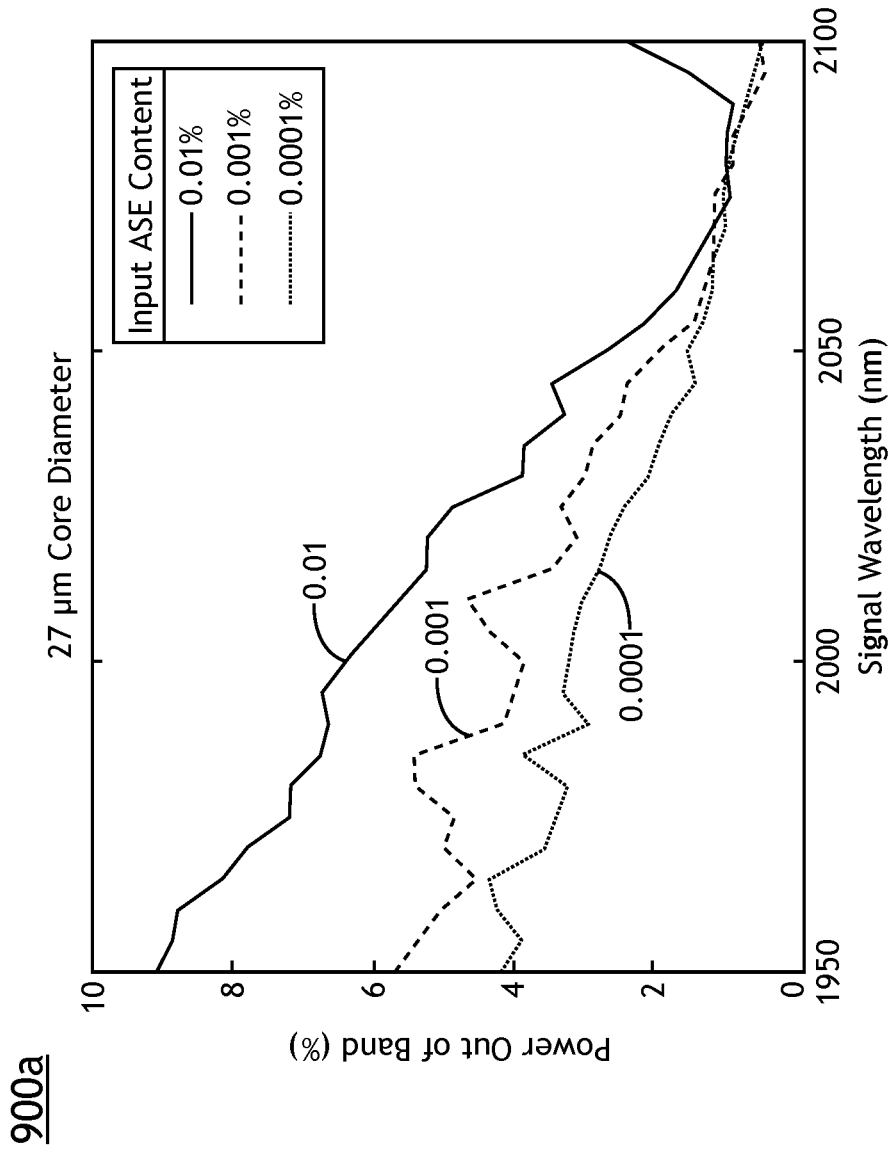
FIG. 9A-9B depict a graph of power out of band as a function of wavelength for an optical fiber, in accordance with one or more embodiments of the present disclosure.
Figure 9B:
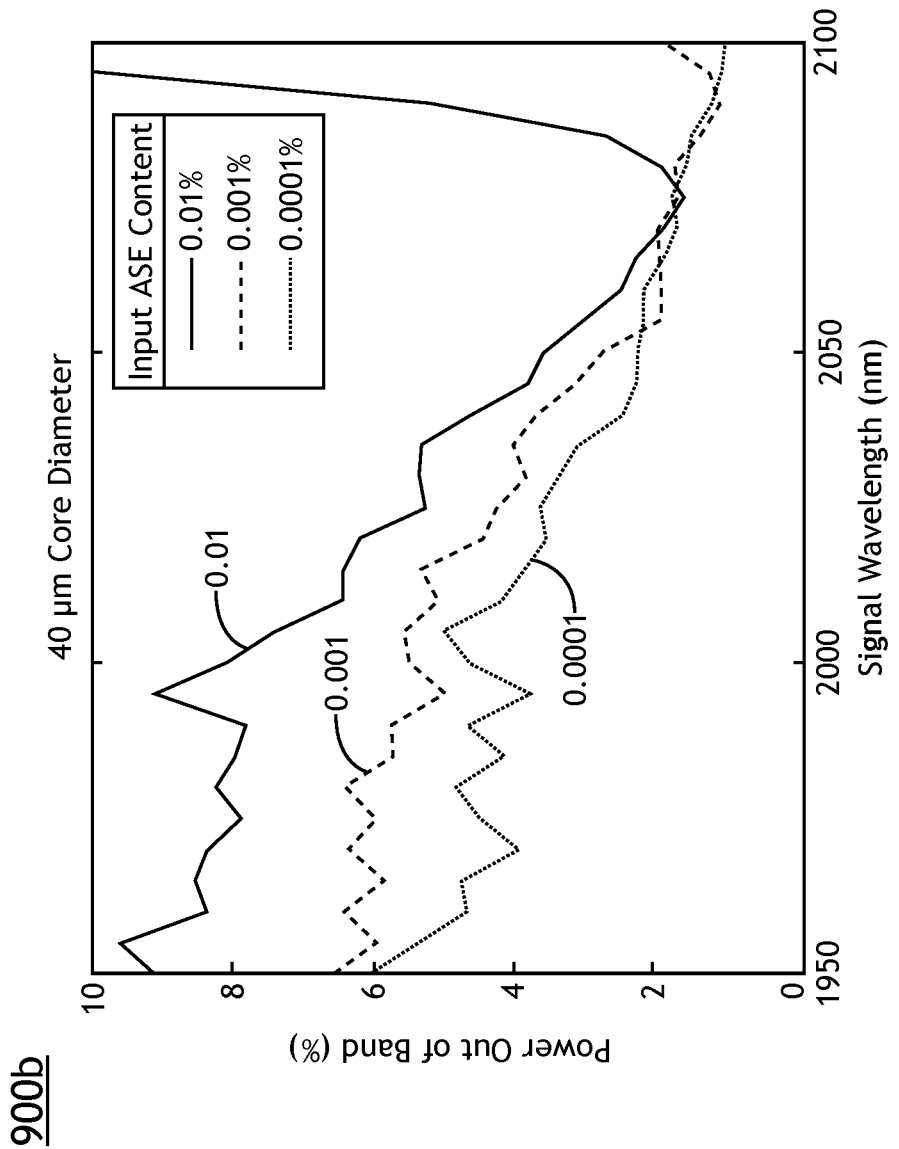

Referring now to FIGS. 9A-9B, a graph depicting a percent power out of band as a function of signal wavelength is described, in accordance with one or more embodiments of the present disclosure. Graph 900a depicts percent power out of band as a function of signal wavelength for the optical fiber 112a with the core diameter of 27 micrometers. Graph 900b depicts percent power out of band as a function of signal wavelength for the optical fiber 112b with the core diameter of 40 micrometers. The graphs also depict the effects of varying levels of input amplified spontaneous emission (ASE). Graph 900a depicts the input amplified spontaneous emission (ASE) varied between 0.01 percent, 0.001 percent, and 0.0001 percent. Graph 900b depicts the input amplified spontaneous emission (ASE) varied between 0.01 percent, 0.001 percent, and 0.0001 percent. The effects of varying levels of amplified spontaneous emission (ASE) in the input to the final multi-kW amplifier are examined. The total out of band power (combined ASE and MI sideband power) may be maintained to less than 1% for high power applications. Spectral purity at multi-kW power levels may be difficult to obtain based on these findings. Such spectral purity can be achieved near 2050 nanometer for both fiber designs due to the reduced rare-earth gain at these wavelengths. Aggressive spectral management at wavelengths less than 2050 nanometer may be used to ensure the usefulness of high power in-band pumped TDF amplifiers.

Finally, as previously mentioned, a significant difference exists between modulation instability (MI) and stimulated Raman scattering (SRS). The gain spectrum of modulation instability (MI) is typically located under the gain spectrum of thulium. In contrast, the stimulated Raman scattering (SRS) signal may not benefit from high rare-earth ion gain due to the much larger frequency shift induced by the stimulated Raman scattering (SRS) process. Any residual power located within the amplified spontaneous emission (ASE) bandwidth may seed the modulation instability (MI) process and further limit output powers in a laser system. Aggressive spectral filtering prior to amplification may be used to ensure modulation instability (MI) can be suppressed. Introducing waveguide loss or distributed fiber Bragg gratings that filter the signal and/or idler waves during propagation may be effective at preventing modulation instability (MI).

Figure 10:
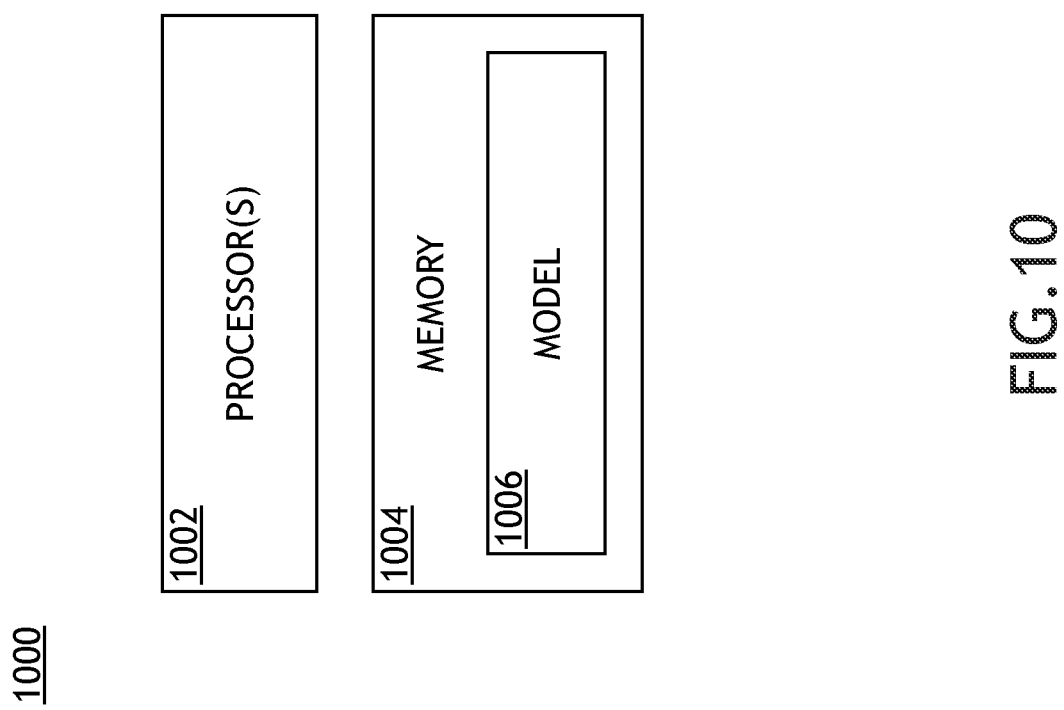
FIG. 10 depicts a system configured to execute a model, in accordance with one or more embodiments of the present disclosure.

Referring now to FIG. 10, a system 1000 is described, in accordance with one or more embodiments of the present disclosure. The system 1000 may include one or more processor(s) 1002 and memory 1004.

The processor 1002 may include any processing unit known in the art. For example, the processor may include a multi-core processor, a single-core processor, a reconfigurable logic device (e.g., FPGAs), a digital signal processor (DSP), a special purpose logic device (e.g., ASICs)), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

The memory 1004 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure. For example, the program instructions may include a model 1006.

A discussion of the model 1006 is now provided, in accordance with one or more embodiments of the present disclosure. The model 1006 may be used to simulate the performance of TDFLs when pumped at either 793 nanometer or between 1900 to 1910 nanometer. The model 1006 uses the rate equations associated with the four-level thulium ion system and includes the effects of various energy transfer processes. The model 1006 is spectrally resolved such that amplified spontaneous emission (ASE) is taken into account. Equations for the first four levels of thulium are shown in Equations 1-4.

$$\frac{dN_0}{dt} = \frac{N_1}{\tau_{10}} + W_{10}N_1 - W_{01}N_0 - W_{03}N_0 + \quad (1)$$

$$W_{30}N_3 + k_{1013}N_1N_1 - k_{3101}N_3N_0 + k_{1012}N_1N_1 - k_{2101}N_2N_0$$

$$\frac{dN_1}{dt} = \frac{N_2}{\tau_{21}} - \frac{N_1}{\tau_{10}} - W_{10}N_1 + W_{01}N_0 - \quad (2)$$

$$2(k_{1013}N_1N_1 - k_{3101}N_3N_0 + k_{1012}N_1N_1 - k_{2101}N_2N_0)$$

$$\frac{dN_2}{dt} = \frac{N_3}{\tau_{32}} - \frac{N_2}{\tau_{21}} + k_{1012}N_1N_1 - k_{2101}N_2N_0 \quad (3)$$

$$\frac{dN_3}{dt} = W_{03}N_0 - W_{30}N_3 - \frac{N_3}{\tau_{32}} + k_{1013}N_1N_1 - k_{3101}N_3N_0 \quad (4)$$

Here $\tau_{ij}$ and $\sigma_{ij}$ are the lifetime and absorption/emission cross-section between $N_i$ and $N_j$ respectively, the coefficients $k_{ijkl}$ describe various energy transfer processes and the stimulated transition rates $W_{ij}$ are given by $$W_{ij} = \frac{1}{hc \cdot A_{core}} \sum_m P_{ij}(\lambda_m) \cdot \lambda_m \cdot \Gamma(\lambda_m) \cdot \sigma_{ij}(\lambda_m) \quad (5)$$

where h is Planck's constant, c is the speed of light, $A_{core}$ is the doped core area, and $\Gamma$ is the mode overlap with the doped core region. The stimulated transition rates $W_{ij}$ are summed over all wavelengths $\lambda_m$ relevant for a given transition between $N_i$ and $N_j$.

The propagation of optical powers $P_{ij}(\lambda_m)$ in the presence of amplified spontaneous emission (ASE) are given by Equations 6 and 7

$$\frac{dP_{ij}(z)}{dz} = P_{ij}(z)[\Gamma(\lambda_m)(\sigma_{ij}(\lambda_m)N_i(z) - \sigma_{ji}(\lambda_m)N_j(z)) - \delta(\lambda_m)] + ASE_{ij} \quad (6)$$

$$ASE_{ij} = \frac{2hc^2\Delta\lambda}{\lambda_m^3}\sigma_{ij}(\lambda_m)N_i(z) \quad (7)$$

where $\delta(\lambda_m)$ is the background propagation loss at each specified wavelength $\lambda_m$. Equation 7 allows for simulating any continuous wave (CW) TDFL pumped at 793 nanometer or between 1900 and 1910 nanometer given the thulium absorption/emission cross-sections and background loss values for a particular Tm-doped fiber.

While the above formalism captures all relevant phenomena in a typical rare-earth doped fiber amplifier, it does not account for the parametric gain imparted by the degenerate four-wave mixing (DFWM) process responsible for modulation instability (MI). To incorporate this, a subroutine is integrated into the steady-state laser model presented above to include the effects of DFWM. Critically, since the spectral sidebands generated as a result of modulation instability (MI) lie under the thulium gain bandwidth and thus receive gain from the thulium ions, the DFWM subroutine works simultaneously with the laser code to model the spectral evolution throughout the fiber amplifier.

In this context, the pump, signal and idler waves will be denoted by $\lambda_p$, $\lambda_s$ and $\lambda_i$ with their corresponding powers $P_p$, $P_s$ and $P_i$. The parametric gain equations describing the modulation instability (MI) process are then given by the following equations:

$$\frac{dP_p(z)}{dz} = -4\gamma_p\sqrt{P_p^2 P_s P_i}\sin\theta \quad (8)$$

$$\frac{dP_s(z)}{dz} = 2\gamma_s\sqrt{P_p^2 P_s P_i}\sin\theta \quad (9)$$

$$\frac{dP_i(z)}{dz} = 2\gamma_i\sqrt{P_p^2 P_s P_i}\sin\theta \quad (10)$$

$$\frac{d\theta_{i,s}}{dz} = \quad (11)$$

$$\Delta\beta + \gamma_{i,s}(2P_p - P_s - P_i) + \left[\gamma_s\sqrt{\frac{P_p^2 P_i}{P_s}} + \gamma_i\sqrt{\frac{P_p^2 P_s}{P_i}} - 4\gamma_p\sqrt{P_i P_s}\right]\cos\theta$$

$$\theta(z) = \Delta\beta \cdot z + 2\phi_p(z) - \phi_s(z) - \phi_i(z). \quad (12)$$

$$\gamma_j = \frac{2\pi n_2}{\lambda_j A_{eff}} \quad (13)$$

The $\gamma_j$ term is the nonlinear coefficient at a specified wavelength $\lambda_j$ and $n_2 = 2.6 \cdot 10^{-20}$ cm$^2$/W is the nonlinear refractive index of silica. The first term $\Delta\beta$ in Equation 11 is the linear phase mismatch approximated by $\beta_2(\omega - \omega_{s,i})^2$, where $\beta_2$ is the group velocity dispersion (GVD), while the second and third terms describe the nonlinear phase shift.

The relative phase difference $\theta(z)$ between the pump and signal/idler waves the input of the system is given by Eq. 12, where $\phi_j$ includes the initial phase of each wave at the input of the system. Finally, the integration of modulation instability (MI) into the amplifier model is given by Equation 14.

$$\frac{dP_{ij}(z)}{dz} = \quad (14)$$
$$P_{ij}(z)[\Gamma(\lambda_m)(\sigma_{ij}(\lambda_m)N_i(z) - \sigma_{ji}(\lambda_m)N_j(z)) - \delta(\lambda_m)] + ASE_{ij} + MI$$

While the modulation instability (MI) process is often dealt with in the context of the un-depleted pump approximation, this assumption fails for the case of rare-earth doped fiber amplifiers where the optical power changes drastically during propagation as a result of the rare-earth ion gain. Thus, both the rare-earth gain as well as modulation instability (MI) gain terms along with amplified spontaneous emission (ASE) are required to accurately simulate the spectral dynamics of such fiber amplifiers. The total modulation instability (MI) term in Equation 13 is then given by the sum of all parametric interactions between the pump wave and both signal and idler waves given by Equations 8-12.

For cases where there is high pump power and low noise-limited signal and/or idler power, the input relative phase $\phi_{s,i}$ for the signal/idler are $\pi/2$. This provides maximum gain to the signal and idler. For cases where the amplifier is seeded by residual amplified spontaneous emission (ASE), the input relative phase is initialized using a random number generator. For accuracy, the amplifier model runs numerous iterations with random input phases and averages the results. This approach closely resembles a practical fiber amplifier that is seeded with residual amplified spontaneous emission (ASE) from a previous amplifier. Nevertheless, the input relative phase has minimal impact on the calculated modulation instability (MI) threshold for a high-power pump.

Incorporating modulation instability (MI) into the fiber amplifier model may only be valid for temporally coherent sources. For the majority of amplifiers used, the seed is a narrow-linewidth oscillator and fulfills this requirement. However, for an incoherent source such as amplified spontaneous emission (ASE), this methodology breaks down. This is because the temporal incoherence, or partial coherence, indicates there are fast intensity fluctuations on a timescale of the inverse spectral bandwidth. These intensity fluctuations generate high instantaneous peak powers and enhance nonlinear processes, especially MI. Although not described, the model 1006 may incorporate the temporal fluctuations.

The model 1006 may provide a simple and fast simulation to predict the onset of modulation instability (MI) for standard narrow-linewidth fiber amplifiers, which are typically seeded with temporally coherent sources. As such, the model 1006 may be used for predicting the onset of modulation instability (MI) for the multi-kW continuous wave (CW) amplifier design.

Figure 11:
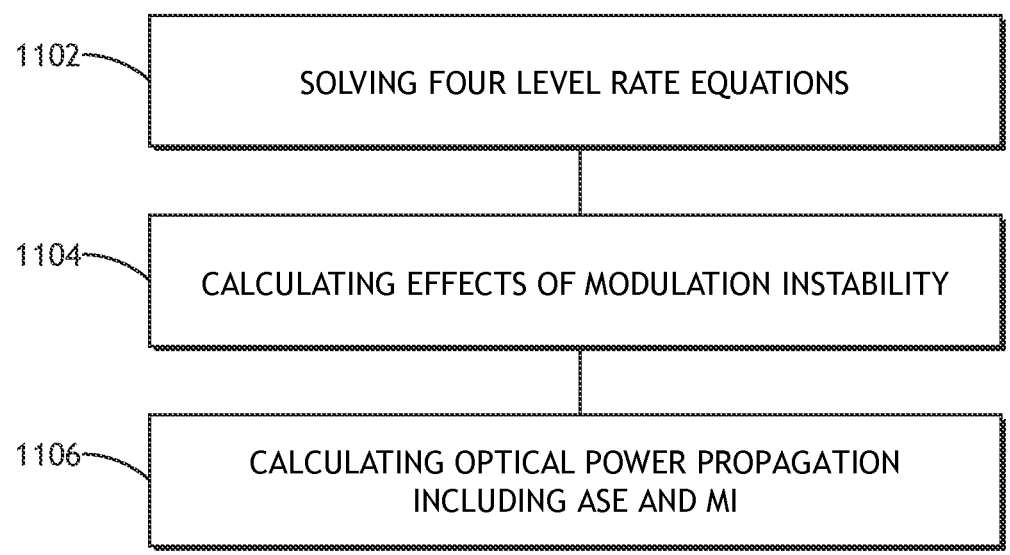
FIG. 11 depicts a flow diagram of a method, in accordance with one or more embodiments of the present disclosure.

Referring now to FIG. 11, a flow diagram of a method 1100 is described, in accordance with one or more embodiments of the present disclosure. The method 1100 may be implemented by numerical simulation code in the 1006. The embodiments and the enabling technology of the system 1000 are incorporated by reference in regards to the method 1100. The method 1100 may be used to comprehensively simulate the energetic and nonlinear processes occurring within thulium-doped fibers during laser amplification.

The method 1100 may include one or more input parameters. The input parameters may include a dopant concentration of thulium, a core diameter, an outer cladding diameter, an inner cladding diameter, a polymer coating diameter, a core numerical aperture (NA), an optical fiber length, an input amplified spontaneous emission (ASE) content, a signal wavelength, a pump wavelength, a signal power, a pump power, a number of iterations to average results over, a binary variables to turn on/off gain, an amplified spontaneous emission (ASE), and/or nonlinearities.

The method 1100 may be used determine a longitudinally-resolved power, a spectrum, an inversion levels and a thermal load information for an optical fiber (e.g., the optical fiber 112). The method 1100 may determine the various values by iteratively performing one or more steps. Longitudinally-resolved power may refer to a longitudinally resolved optical power for all optical fields of the optical fiber. Spectrum may refer to an output spectrum of light output from the optical fiber. Inversion level may refer to an inversion level for all relevant electronic energy levels of the optical fiber. Thermal load information may refer to a longitudinally resolved thermal load of the optical fiber.

A step 1102 may include solving one or more rate equations for the Tm3+ ion doped in a fused silica host in conjunction with amplified spontaneous emission. The fused silica host may refer to an optical fiber (e.g., optical fiber 112) including one or more layers of silica glass. For example, the fused silica host may include an outer cladding, an inner cladding, and/or a core formed of a silica glass material. The one or more rate equations may include any of the rate equations described in regards to the model 1006. For example, the rate equations may include the equations (1) through (4). The equations (1) through (4) may also be referred to as four-level rate equations. The equations (1) through (4) may be solved taking into account (e.g., in conjunction) with the amplified spontaneous emission.

A step 1104 may include calculating the effects of modulation instability on light output by the optical fiber using resulted obtained from solving the rate equations. The light output from the optical fiber may be signal light which has been amplified by pump light. The results obtained from solving the rate equations in step 1102 may be used as initial conditions. The initial conditions may be fed into a subroutine. The subroutine may calculate the effects of modulation instability. The modulation instability may be a primary nonlinearity encountered in a fiber amplifier. The effects of modulation instability may be calculated using one or more equations from the model 1006. For example, the equations may include, but are not limited to, equations (8) through (13). In embodiments, various phase relationships between the amplified laser signal and the modulation instability sidebands may be defined. In embodiments, a random number generator may be used to populate the initial phase distributions. The code implementing the step 1104 may default to using the random number generator to populate the initial phase distributions in an effort to most closely mimic real-world scenarios. The simulation may be seeded with a variety of values ranging from 0 to 2*pi. The relative MI gain may be influenced by inputting a set phase relationship for the pump, signal and idler. It is contemplated that seeding with values from a random number generator may improve an accuracy of the simulation.

A step 1106 may include calculating an optical power propagation. The optical power propagation may refer to a power provided by the optical fiber. The optical power propagation may include the amplified spontaneous emission (ASE) and modulation instability (MI). The optical power propagation may be calculated using one or more equations from the model 1006. For example, the equations may include, but are not limited to, equation (14). The amplified spontaneous emission (ASE) and modulation instability (MI) may be introduced into the equation for optical power propagation after solving the rate equations.

The method 1100 may include one or more outputs. The outputs may include graphical code outputs. The graphical code outputs may include a longitudinally-resolved optical power for all optical fields, inversion levels for all relevant electronic energy levels, longitudinally-resolved thermal load, longitudinally-resolved out of band power, and/or output spectrum at the end of the fiber. The outputs may include numerical code outputs. The numerical code outputs may include output power, slope efficiency, transmitted pump power, total pump absorption, pump absorption per unit length, core V-number, and/or elapsed time required to run the program.

Referring generally again to FIGS. 1-11, the various ranges described herein are exemplary, and are not intended to be limiting. Where the ranges are described as between two values, this is intended to be in the inclusive form. For example, between A and B is intended to mean between A and B inclusive of both A and B. Such inclusive form is intended unless expressly described otherwise. Furthermore, the term at or near should be intended to mean within one significant digit.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An optical fiber comprising:
   a core including a circular cross-section, wherein the core has a core diameter, a core numerical aperture, and a V-number, wherein the core diameter is greater than 20 micrometers, wherein the core is configured to propagate a signal light from a first end of the optical fiber to a second end of the optical fiber, wherein the signal light includes a signal wavelength of between 1950 and 2100 nanometers, wherein the V-number is less than 3.83, wherein the core is doped with a concentration of thulium, wherein the core numerical aperture is between 0.06 and 0.12;
   an inner cladding disposed on and surrounding the core, the inner cladding including a non-circular cross section; and
   an outer cladding disposed on and surrounding the inner cladding;
   wherein the optical fiber is configured to receive the signal light and a pump light, the pump light having a pump wavelength of between 1900 and 1910 nanometers; wherein the core is configured to amplify the signal light in response to receiving the signal light and the pump light.

2. The optical fiber of claim 1, wherein the concentration of thulium is between 31 times $10^{25}$ and 40 times $10^{25}$ ions/m^3.

3. The optical fiber of claim 2, wherein the inner cladding has an inner cladding diameter; wherein the inner cladding diameter is at least 1.5 times larger than the core diameter.

4. The optical fiber of claim 3, wherein the inner cladding diameter is at least three times larger than the core diameter.

5. The optical fiber of claim 3, wherein the core diameter is between 20 and 50 micrometers; wherein the V-number is between 2.3 and 3.83 such that the core supports no more than two guided optical modes; wherein the inner cladding diameter is between 60 and 250 micrometers; wherein the inner cladding has an inner cladding numerical aperture; wherein the inner cladding numerical aperture is greater than or equal to 0.22.

6. The optical fiber of claim 5, wherein the core diameter is between 27 and 40 micrometers; wherein the core numerical aperture is between 0.06 and 0.09.

7. The optical fiber of claim 6, wherein the optical fiber is configured to amplify the signal light to an output power of 5 kilowatts or greater across the signal wavelength while maintaining a peak thermal load of less than 190 watts per meter; wherein a length of the optical fiber from the first end to the second end is between 13 and 18 meters.

8. The optical fiber of claim 6, wherein the optical fiber is configured to amplify the signal light to an output power of 11 kilowatts or greater across a wavelength from 1950 to 2050 nanometers while maintaining a peak thermal load of less than 190 watts per meter; wherein a length of the optical fiber from the first end to the second end is between 12 and 17 meters.

9. The optical fiber of claim 1, wherein the non-circular cross-section comprises an octagonal cross-section.

10. The optical fiber of claim 1, wherein the optical fiber includes a slope efficiency of greater than 70 percent across the signal wavelength.

11. The optical fiber of claim 10, wherein the optical fiber includes the slope efficiency of greater than 90 percent when the signal wavelength is 1950 nanometers.

12. The optical fiber of claim 1, wherein a pump absorption per unit length in the core is between 0.5 and 0.8 decibels per meter; wherein the core is configured to amplify the signal light by 20 decibels or less.

13. The optical fiber of claim 1, wherein the outer cladding has an outer cladding diameter of 400 μm; wherein the outer cladding has an outer cladding numerical aperture of greater than or equal to 0.46; wherein the outer cladding is doped with fluorine; wherein the optical fiber comprises a polymer coating; wherein the polymer coating has a polymer coating diameter of 550 µm.

14. A system comprising:
a pump configured to generate pump light, wherein the pump light has a pump wavelength between 1900 nanometers and 1910 nanometers;
a seed laser configured to generate a signal light, the signal light having a signal wavelength between 1950 nanometers and 2100 nanometers;
an optical fiber, wherein the optical fiber is configured to receive the signal light and the pump light the optical fiber comprising:
a core including a circular cross-section, wherein the core has a core diameter, a core numerical aperture, and a V-number, wherein the core diameter is greater than or equal to 20 micrometers, wherein the core is configured to propagate the signal light from a first end of the optical fiber to a second end of the optical fiber, wherein the V-number is less than 3.83, wherein the core is doped with a concentration of thulium, wherein the core numerical aperture is between 0.06 and 0.12;
an inner cladding disposed on and surrounding the core, the inner cladding including a non-circular cross section, and
an outer cladding disposed on and surrounding the inner cladding;
wherein the core is configured to amplify the signal light in response to receiving the signal light and the pump light.

15. The system of claim 14, wherein the seed laser is configured to generate the signal light with a power between 10 and 200 watts at the signal wavelength; wherein the core is configured to amplify the signal light by 20 decibels or less.

16. The system of claim 14, wherein the pump comprises:
a plurality of pump sources each configured to generate pump source light; and
a laser combiner optically coupled to the plurality of pump sources and configured to combine the pump source light from the plurality of pump sources to generate the pump light.

17. The system of claim 16, wherein the plurality of pump sources includes exactly seven pump sources; wherein the laser combiner is a 7×1 laser combiner.

18. The system of claim 17, wherein the seven pump sources each generate the pump source light with a power of up to 300 watts at the pump wavelength; wherein the pump light includes a power of up to 2.1 kilowatts at the pump wavelength.

19. The system of claim 16, wherein the pump sources each comprise:
a plurality of diodes configured to generate diode light;
a pump combiner optically coupled to the plurality of diodes;
a first fiber Bragg grating optically coupled to the pump combiner, wherein the first fiber Bragg grating has a first reflectivity;
a thulium-doped fiber amplifier optically coupled to the pump combiner; and
a second fiber Bragg grating optically coupled to the thulium-doped fiber amplifier, wherein the second fiber Bragg grating has a second reflectivity; wherein the first reflectivity is lower than the second reflectivity.

20. The system of claim 19, wherein the first reflectivity is 15 percent; wherein the second reflectivity is greater than or equal to 99 percent.

21. The system of claim 19, wherein the plurality of diodes includes exactly six diodes; wherein the pump combiner is a (6+1)×1 pump combiner.

22. The system of claim 21, wherein the plurality of diodes are each configured to generate the diode light with a power of up to 600 watts at a wavelength of 793 nanometers; wherein the plurality of pump sources each generate light with a power of up to 300 watts at the pump wavelength between 1900 and 1910 nanometers.

23. The system of claim 14, further comprising an optical coupler configured to spatially overlap the signal light with the pump light.

24. The system of claim 23, wherein the optical coupler is a dichroic mirror.

* * * * *